(12) United States Patent
Arnicar et al.

(10) Patent No.: US 12,709,293 B1
(45) Date of Patent: Aug. 18, 2026

(54) POSE INITIALIZATION OPTIMIZATION FOR IMPROVED LOCALIZATION

(71) Applicant: Zoox, Inc., Foster City, CA (US)

(72) Inventors: Taylor Andrew Arnicar, Hayward, CA (US); Brice Rebsamen, Bouc-Bel-Air (FR)

(73) Assignee: Zoox, Inc., Foster City, CA (US)

( * ) Notice: Subject to any disclaimer, the term of this patent is extended or adjusted under 35 U.S.C. 154(b) by 270 days.

(21) Appl. No.: 18/590,622

(22) Filed: Feb. 28, 2024

(51) Int. Cl.

| | |
|---|---|
| ***B60W 60/00*** | (2020.01) |
| ***B60W 50/02*** | (2012.01) |
| ***B60W 50/032*** | (2012.01) |

(52) U.S. Cl.
CPC ...... *B60W 60/001* (2020.02); *B60W 50/0205* (2013.01); *B60W 50/032* (2013.01); *B60W 2050/0215* (2013.01); *B60W 2554/20* (2020.02); *B60W 2556/40* (2020.02)

(58) Field of Classification Search
CPC ........... B60W 60/001; B60W 50/0205; B60W 50/032; B60W 2050/0215; B60W 2554/20; B60W 2556/40
See application file for complete search history.

(56) References Cited

U.S. PATENT DOCUMENTS

| | | | | |
|---|---|---|---|---|
| 12,423,988 | B1 * | 9/2025 | Daniels | B60W 50/10 |
| 12,516,956 | B2 * | 1/2026 | Kothari | G01C 21/3837 |
| 2025/0065894 | A1 * | 2/2025 | Luo | B60W 50/0205 |
| 2025/0162612 | A1 * | 5/2025 | Woelki | B60W 60/00274 |
| 2025/0171020 | A1 * | 5/2025 | Chandra Shekar | B60W 30/146 |
| 2025/0200788 | A1 * | 6/2025 | Mishra | G01S 19/42 |

FOREIGN PATENT DOCUMENTS

| | | | | |
|---|---|---|---|---|
| EP | 4153943 | B1 * | 12/2025 | G05D 1/0278 |

* cited by examiner

*Primary Examiner* — Masud Ahmed
(74) *Attorney, Agent, or Firm* — Lee & Hayes, P.C.

(57) ABSTRACT

In order to operate reliably and effectively, an autonomous vehicle may at least partially rely on accurately determining an initial position and orientation of the vehicle within the environment. Without an accurate localization of the vehicle's location, position, and orientation in an environment, the vehicle's perception and/or planning components may be hindered, thereby reducing the effectiveness and/or safety of the vehicle. Techniques of the disclosure herein are related to initializing a localization component of a vehicle.

20 Claims, 5 Drawing Sheets

POSE INITIALIZATION OPTIMIZATION FOR IMPROVED LOCALIZATION

BACKGROUND

In order to operate reliably and effectively, an autonomous vehicle may at least partially rely on accurately detecting where the autonomous vehicle is within the environment, i.e., a localization of the autonomous vehicle. Autonomous vehicles may use this localization and sensor data received by the autonomous vehicle to plan operation of the vehicle and predict an outcome of the vehicle's operations. Without an accurate localization of the vehicle's location, position, and orientation in an environment, the vehicle's perception and/or planning components may be hindered, thereby reducing the effectiveness and/or safety of the vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
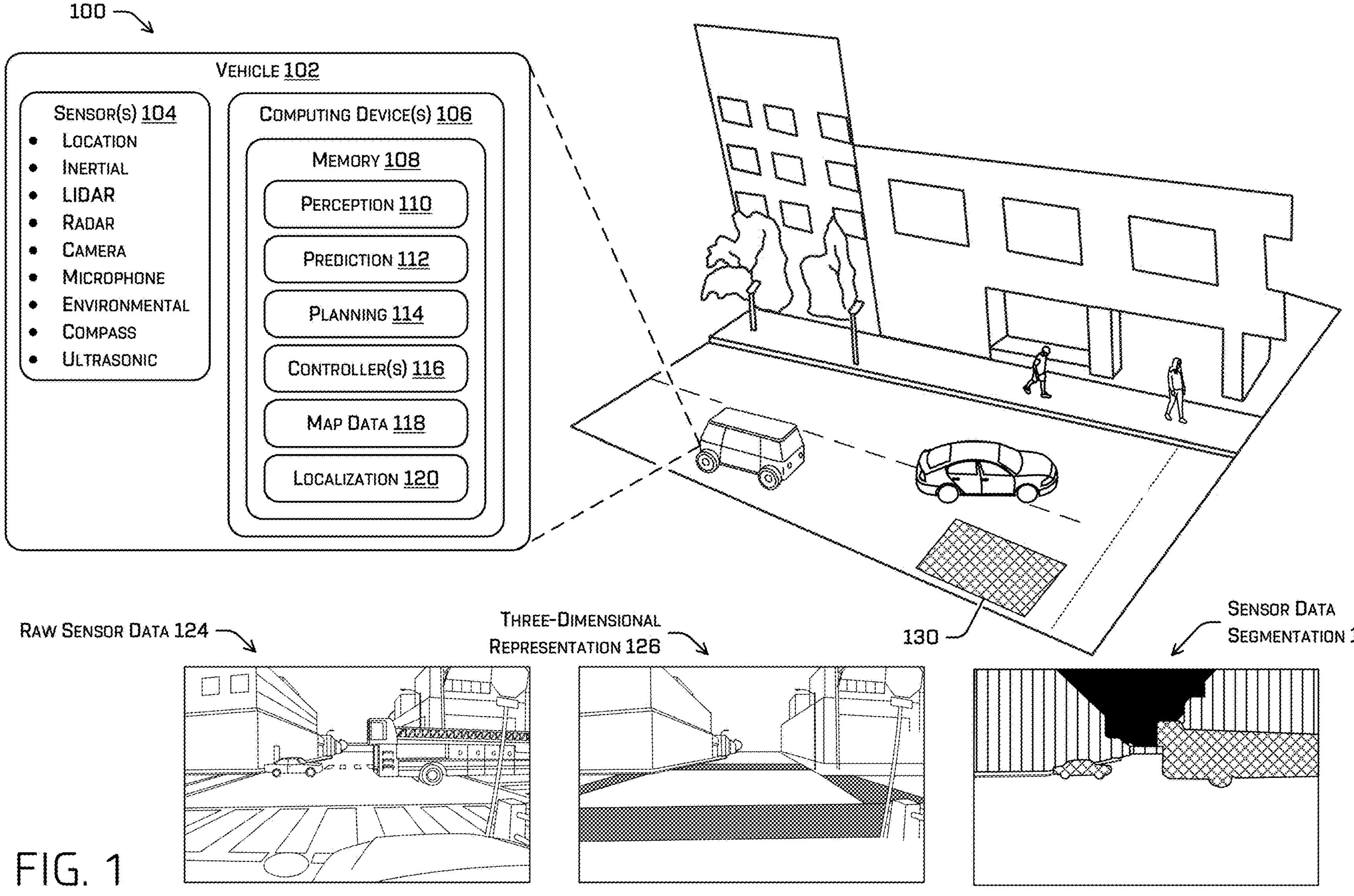
FIG. 1 illustrates an example scenario in which an autonomous vehicle may receive sensor data associated with a pose initialization location that may be used to localize the vehicle within the vehicles' environment, in accordance with one or more implementations of the disclosure.

As discussed above, autonomous vehicles may rely at least partially on accurately determining their relative position and orientation (collectively referred to herein as pose data) within their surrounding environment to operate reliably, safely, and effectively. Such vehicles may include a localization component that may receive sensor data from one or more sensors and may determine and update the vehicle's precise pose data based on that sensor data. For example, the vehicle may use an initial estimate of the vehicle's pose within the environment to determine a displacement from that pose based on inertial sensor data; wheel encoder data; fitting camera, lidar, and/or radar data to map data of the environment, and/or the like. Without a sufficiently accurate initial pose, a vehicle may inaccurately track progress of the vehicle in the environment and/or inaccurately determine a relative pose of the vehicle in the environment, which may result in a planning component of the vehicle that relies on such data to determine a trajectory for the vehicle that is unsafe or inefficient.

The techniques (e.g., hardware, software, machine-learned model(s), a combination thereof) discussed herein may comprise periodically determining an initial pose of the vehicle, which is referred to herein as an initial localization and may practically function as a starting point from which the vehicle may determine the vehicles' progress and/or as a probabilistic prior for machine-learned model(s) of the vehicle that condition their output on an assumed starting point of the vehicle. Successful initial localization may improve the accuracy of the vehicle's detection of objects around it or may improve the safety and reliability of operation associated with the vehicle's perception and/or planning components. Aspects of this disclosure relate to techniques to optimize and expedite the initial localization procedure.

In some examples, a pose initialization procedure may comprise comparing a vehicle's sensor data to map data of one or more stored pose initialization locations. The vehicle may use this comparison to determine which pose initialization location the vehicle is located at. For example, the vehicle may determine an indicator of a fit of the sensor data to map data indicated by a particular pose initialization location, such as determining a confidence score or average Euclidean distance between sensor data points received by the vehicle and surface(s) indicated by map data associated with the particular pose initialization location. The vehicle may determine that it is located at a pose initialization location by determining that the average Euclidean distance (or another measure of comparison discussed herein, such as a confidence score) is less than an average Euclidean distance threshold (or for a confidence score, above a confidence score threshold) or is the minimum average Euclidean distance (or maximum confidence score) from among multiple averages/confidence scores determined by comparing the sensor data to different pose initialization locations' map data. In some examples, a region, such as a city or a sub-region thereof, may include a set of pose initialization locations. The vehicle may determine a sub-set of these pose initialization locations that are within a threshold distance of an estimated location of the vehicle. The vehicle may determine that estimated location based at least in part on sensor data (e.g., a GPS signal or any of the other techniques described herein) or a stored location of the vehicle indicating a last location determined by the vehicle, such as before the vehicle was powered off, entered a different mode, or the like.

In some examples, the vehicle may trigger a pose initialization based at least in part on detecting an event. For instance, after a reboot of various software and/or hardware components or after transitioning from a low power or low operations mode, the vehicle may execute a pose initialization. Similarly, after a vehicle component or sensor is impaired (e.g., a sensor is obscured or impaired in transit, an object impacts a portion of the vehicle) or otherwise has a component or sensor failure, the vehicle may re-trigger a pose initialization to correct or mitigate any errors in the vehicles' pose or perception, planning, or localization components. Vehicles may also trigger a pose initialization procedure when manually instructed to do so by a remote operator, for example, or may do so after the passage of a threshold amount of time in order to maintain an accurate and precise understanding of the vehicles' pose. As discussed in more detail below, there are many events and/or situations where a pose initialization may be triggered, and the examples noted are not exhaustive.

Once a pose initialization trigger event is detected, a vehicle may determine whether the vehicles' prior pose initialization data is still valid. For example, when a vehicle enters an operational mode after charging or otherwise, the vehicle may first determine whether the pose data that was collected or determined before it entered a low operation or low power mode is still accurate. The vehicle may do so by comparing the last sensor data it received with sensor data of the vehicle's surroundings and/or map data to determine a confidence score associated with the similarities and/or differences. If the confidence score meets or exceeds a threshold confidence score, the vehicle may use the stored pose as its initial pose (e.g., for further localization, perception, and/or planning operations of the vehicle). Additionally or alternatively, the stored pose data may be used to determine an estimated location of the vehicle that can be used to determine a subset of pose initialization locations within a threshold distance of the vehicle. The vehicle may either determine that the vehicle is already located at one of these pose initialization locations or may move the vehicle to an estimated closest pose initialization location of the subset to execute the pose initialization operations described herein.

In an additional or alternative instance, if a vehicle is towed and/or maneuvered while it is powered off or in a low operation mode or low power state, or if an operator manually maneuvers a vehicle outside of a specified map radius, the stored pose and/or location data may no longer be valid. For example, if a vehicle powered off or went into a low operation mode or low power state in position A at location one but powers on or otherwise enters an operational mode in position B at location two, the vehicle's confidence score associated with its saved pose and/or location data may fall below a threshold confidence score, thus indicating that the vehicle's saved pose data is invalid or otherwise inaccurate. In such a situation, the vehicle may re-initialize its pose and/or location in order to reliably and safely navigate in the environment. To do so, the vehicle may determine its estimated location without the use of the vehicles stored location and pose data. If the last stored location and/or pose of the vehicle is sufficiently dissimilar to the vehicle's location and/or surroundings after powering on or otherwise entering an operational mode (e.g., as may be indicated by a confidence score that is below a threshold, an average Euclidean distance that is above a threshold, a GPS signal that indicates a location different from a stored location), or if the vehicle lacks a sufficient confidence score associated with its location and/or pose, the vehicle may determine its estimated location. Location data may comprise global positioning satellite (GPS) data, compass data, and/or the like, as discussed in more detail below.

After receiving data associated with the vehicle's estimated location, such as sensor data and/or perception data, the vehicle may then determine a subset of pose initialization locations within a radius of the estimated location. Pose initialization locations may be located throughout a city or environment. For instance, they may be located at or near charging locations, in or around maintenance and/or services stations, at a command/control center, or other accessible locations in an environment, such as specific parking spots. As discussed further below, pose initialization locations may be predetermined candidate locations with unique and/or distinct surroundings (as determined by a sufficient difference between map data associated with the different pose initialization locations) and characteristics such that a vehicle can effectively compare sensor indicating the vehicle's surroundings to map data associated with the pose initialization location in order to accurately localize. The vehicle may receive sensor data associated with the vehicles estimated location, and then search within a radius or an expanding radius (e.g., first a radius of 10 meters, then 50 meters, then 100 meters, and so on) until the vehicle determines a subset of candidate pose initialization locations within the radius or expanded radius. In another example, the vehicle may search a threshold radius (e.g., 50 meters or 100 meters) to determine a set of candidate pose initialization locations within that radius. In another example, the vehicle may receive a subset of candidate pose initialization locations from a superset that may be provided by a remote operator or a retrievable database that may be based at least in part on the vehicle's estimated location.

In an alternate scenario where the saved pose data is invalid or inaccurate and the vehicle is also unable to receive location data (e.g., due to a lack of network connectivity, inclement weather, one or more compromised components, tall buildings and/or a convoluted environment), the vehicle may use its last stored location to estimate its current location and/or to determine a set of candidate pose initialization locations within a region near the last stored location. For example, if a vehicle is located in a tunnel and both the vehicle's saved location and pose data is invalid and it is unable to receive estimated location data, the vehicle may search an area around its last saved location to determine a set of candidate pose initialization locations.

The vehicle may then determine which pose initialization location of the set of pose initialization locations it is located at or nearest to. To do this, the vehicle may receive second sensor data associated with one or more features/surfaces of its environment from one or more sensors. The one or more sensors may include a location sensor (e.g., a global positioning system (GPS) sensor), an inertia sensor (e.g., an accelerometer sensor, a gyroscope sensor, etc.), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or any combination thereof. For example, the vehicle may receive lidar data from one or more lidar sensors associated with the vehicle. This lidar data may include a set of data points, also referred to herein as a point cloud, wherein an individual lidar point may indicate a distance from the sensor to a surface in the environment. In some examples, such lidar data may be projected into or converted to a voxel space. Additionally or alternatively, the vehicle may receive image sensor data of the objects/features/surfaces of the environment around the vehicle. Using the point cloud received from the lidar sensors or the images received from the image sensors as in the above examples, the vehicle may then compare the second sensor data to the surfaces and/or features indicated by map data of individual pose initialization locations of the subset of candidate pose initialization locations. By determining a difference between at least a portion of the second sensor data and a surface or feature indicated by map data at a particular pose initialization location, a confidence score for each of the pose initialization locations can be determined. For example, if the vehicle is at pose initialization location A, and pose initialization locations B and C are also part of the set of pose initialization locations, the vehicle may iteratively compare its second sensor data to the different map data associated with pose initialization locations A, B, and C. By determining a difference between at least a portion of the second sensor data and at least a portion of one or more surfaces/features indicated by map data of each of pose initialization locations A, B, and C, the vehicle may determine a higher confidence score associated with pose initialization location A relative to the confidence score it determines for pose initialization locations B and C. That is, the confidence score associated with pose initialization location A may meet or exceed a threshold confidence score based on the differences (and/or similarities) of the second sensor data and one or more surfaces/features indicated by map data, thus indicating that the vehicle is located at pose initialization location A, while the confidence score associated with pose initialization locations B and C may fail to meet or exceed the threshold confidence score.

Additionally or alternatively, the vehicle may iteratively determine a confidence score for each pose initialization location (using each pose initialization location's map data and the second sensor data) until a confidence score for a particular pose initialization location satisfies a threshold confidence score (e.g., by meeting or exceeding the threshold confidence sore), thus indicating that the vehicle is likely located at the particular pose initialization location.

In some examples, a confidence score determined by the vehicle may further be based at least in part on a percentage of the second sensor data that is associated with static objects, as may be determined by a perception component of the vehicle based at least in part on the second sensor data. Prior to or simultaneously with determining a confidence score for each pose initialization location, a perception component of the vehicle may determine a percentage of the second sensor data associated with static objects. In such an example, the non-static (i.e., dynamic/capable of movement/capable of locomotion) objects such as pedestrians, vehicles, bicycles, and the like may be filtered out of the second sensor data to avoid impacting the determination of the confidence score associated with the pose initialization locations of the subset of pose initialization locations. In other words, since dynamic objects may be non-permanent and/or inconsistent, determining a confidence score for a pose initialization location may be more accurate and/or reliable when only the static objects of the second sensor data are compared to the surfaces/features of the pose initialization location indicated by the map data. In some examples, the confidence score may be capped or multiplied by a percentage of the second sensor data that is associated with static object(s).

Additionally, or alternatively, the vehicle may determine that the second sensor data comprises a portion of the second sensor data that is associated with an indicator. An indicator may be a unique identifier (e.g., quick-response (QR) code, bar code, radio frequency identification (RFID) tag, a distinct or uniquely shaped object) that may be associated with a particular pose initialization location. For example, a charging station may display a unique QR code (e.g., on the ground beneath a vehicle situated to employ the charger or on a face of a charger), whereby a vehicle may use an image sensor to capture sensor data indicating the QR code. In some examples, a charging station/location may comprise an RFID tag that a vehicle 102 may use to determine its pose and/or location data. In addition to or in lieu of a vehicle receiving an estimated location and sensor data of the vehicle's surrounding environment, the vehicle may be able to receive sensor data associated with scanning/reading/capturing sensor data associated with the indicator and thereby retrieve data associated with the location of the pose initialization location associated with the indicator. In another example, a vehicle may receive lidar or radar data of a unique three-dimensional object in the environment (e.g., an art installation or distinct building feature) that may be associated with an individual or subset of pose initialization locations. The vehicle may then use this sensor data to determine a location and pose of the vehicle within its environment, thereby improving the effectiveness and reliability of a localization, planning, perception, or other component of the vehicle. For example, the vehicle may determine a global location and/or geolocation having any coordinate frame (e.g., a map coordinate frame, vehicle coordinate frame, or the like) associated with the indicator and may use second sensor data to determine a relative position of the vehicle to the indicator. The vehicle may use the relative position as an offset from the location associated with the indicator to determine a global position and/or orientation of the vehicle within the environment.

After a confidence score of a particular pose initialization location meets or exceeds a threshold confidence score, the vehicle may then determine its initial pose. The vehicle may determine its initial pose based at least in part on a geolocation and map data associated with a pose initialization location and a relative position of the vehicle, where the relative position of the vehicle may be based at least in part on the second sensor data. The second sensor data as discussed above may provide the vehicle with an accurate determination of its precise position and orientation within a pose initialization location. After determining an initial pose, the vehicle may localize itself with a localization component (e.g., using simultaneous localization and mapping (SLAM), or the like). For example, the localization component may determine a pose of the vehicle based at least in part on fitting the second sensor data to surfaces indicated by the map data associated with the pose initialization location. This may comprise iteratively changing the pose until the fit, average distance between the second sensor data points and the surface(s), and/or the like is below a threshold fit indication or average distance.

The pose initialization processes and procedures discussed herein increase the reliability and accuracy of a pose initialization, thereby improving the effectiveness of a vehicle's localization system. An improved localization system allows a vehicle to predicate future operations of the vehicle on precise location and orientation within an environment. When a vehicle uses a more acute initial pose, it is better equipped to determine safe and effective controls for maneuvering in the environment. Employing pose initialization locations as discussed herein may reduce the time that a vehicle is inoperable, improve passenger safety by ensuring that a vehicle has a more definite/accurate determination of the vehicle's location and pose, and/or expedite the initialization of the localization system, among other benefits contemplated herein.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, aircraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a prediction component 112, a planning component 114, system controller(s) 116, map data 118, and/or a localization component 120. Although depicted in FIG. 1 for illustrative purposes, it is understood that the map data 118 may reside in/on a separate computing device (or otherwise) than any one or more of the other components, as discussed in more detail below.

In general, the perception component 110 may determine what is in the environment surrounding the vehicle 102 and the planning component 114 may determine how to operate the vehicle 102 according to information received from the perception component 110. For example, the planning component 114 may determine a trajectory based at least in part on the perception data and/or other information such as, for example, map data 118 (such as a map determined according to the techniques discussed herein), localization information (e.g., where the vehicle 102 is in the environment relative to a map and/or features detected by the perception component 110), and/or the like. In some examples, the perception component 110 may comprise a pipeline of hardware and/or software, which may include one or more GPU(s), ML model(s), Kalman filter(s), and/or the like.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, a pose of the vehicle (e.g. position and/or orientation in the environment, which may be determined by or in coordination with a localization component), and/or map data 118. Map data 118 may comprise global map data that identifies characteristics of roadways, such as roadway curvature, configuration, locations, extents, etc.; static object(s); and/or the like. Additionally or alternatively, map data 118 may comprise local map data that identifies characteristics of the environment determined based at least in part on sensor data. Such local map data may indicate locations and/or dimensions of buildings, trees, fences, fire hydrants, stop signs, and any other feature detectable in various sensor modalities, etc.

In some examples, the vehicle 102 may transmit sensor data to a remote computing device, which may use the sensor data to generate map data 118 of the environment. In an additional or alternate example, the localization component 120 may generate part of the map data 118, such as by using a SLAM technique that may be predicated on the initial pose determined according to the techniques discussed herein. Map data 118 may comprise, for example, a two- and/or three-dimensional representation defined by, for example, a mesh, wire frame model, polygons, surfels (e.g., polygons associated with individual color and/or intensity), and/or the like. The remote computing device may transmit such a representation to the vehicle 102, which the vehicle 102 may use to navigate an environment safely and efficiently. For example, the vehicle 102 may use the map data 118 to determine where the vehicle 102 is in the environment, where a drivable surface area is, where static objects are in the environment, where drop-off locations exist, where landmarks are, etc., and may further use such determinations to determine a trajectory for controlling motion of the vehicle 102.

For the sake of simplicity, FIG. 1 depicts raw sensor data 124 that may include indications of the objects, landmarks, characteristics, etc., detected in proximity to the vehicle 102. It is understood that although the raw sensor data 124 depicts raw image sensor data, any one or more sensor(s) 104 may be used to receive the raw sensor data 124. Further depicted is a three-dimensional representation 126 of map data 118. The three-dimensional representation 126 of map data 118 depicts static objects associated with the environment proximate the vehicle 102. Notably, as a nonlimiting example, the three-dimensional representation 126 of map data 118 includes indications of static features associated with the environment and does not include indications of dynamic features associated with the environment. That is, for purposes of illustration, the three-dimensional representation 126 of map data 118 depicts only static objects/features of the environment proximate the vehicle 102. Moreover, the three-dimensional representation 126 merely includes a depiction of a limited view of the three-dimensional representation 126, whereas the map data 118 may comprise more or fewer surfaces indicated in the map data 118.

Further depicted is a sensor data segmentation 128 of the raw sensor data 124 by the perception component 110. The perception component 110 may determine the sensor data segmentation 128 by a machine-learned model that determines a confidence score associated with a portion of the raw sensor data 124. In some examples, the machine-learned model may determine multiple confidence scores associated with a same portion of the raw sensor data 124, where each confidence score is associated with a different object classification. The machine-learned model may then determine a maximum confidence score from among the confidence scores and the object classification associated with that maximum confidence score. The machine-learned model may then output the object classification in association with the portion of the raw sensor data 124 as part of the sensor data segmentation 128. Object classifications may additionally or alternatively be associated with a static or dynamic classification. For example, the object classifications cyclist, vehicle, pedestrian, etc. may be further associated with a dynamic classification, whereas the object classifications building, roadway, signage, etc. may be further associated with a static classification. For illustration purposes only, the sensor data segmentation 128 depicts dynamic objects with diagonal cross-hatching and depicts static objects with vertical cross-hatching. It is understood that there may be many techniques to identify/segment static and/or dynamic objects in an environment, such as masking (e.g., associating a 1 or 0 with a portion of the raw sensor data as an indication of whether or not a static object is detected by the perception component 110 as existing in the raw sensor data), instance segmentation, semantic segmentation, a matrix of confidence scores indicating whether respective portions of the raw sensor data are predicted to be associated with a static object, and/or the like. As discussed in more detail below, the perception component 110 may determine a confidence score associated with up to each portion of sensor data (e.g., pixel, voxel, group of pixels/voxels), where the confidence score may be associated with an object/feature characteristic, such as, for example, a static or dynamic object. In some examples, the localization component 120 may remove, mask out, or otherwise ignore/not use a portion of the sensor data determined to be associated with one or more dynamic objects, such as by determining confidence score(s) associated with the portion meet or exceed a threshold confidence score.

In some examples, the pose initialization techniques discussed herein may be accomplished with just sensor data 124. In such examples, the pose initialization techniques discussed herein may be executed without the use of a three-dimensional representation 126 of map data 118 and/or a sensor data segmentation 128.

FIG. 1 further depicts an example pose initialization location 130. As shown, the pose initialization location 130 may be proximate one or more static and/or dynamic features in the environment. As discussed further below, a pose initialization location 130 may be added to a set of pose initialization locations based at least in part on the distinctiveness of the static features of the environment proximate the pose initialization location 130 compared to the static features of the environment associated with the other pose initialization locations in the set. Additionally or alternatively, as discussed in more detail below, a pose initialization location 130 may be generated by a vehicle 102 prior to powering off or otherwise entering a low operation state. For illustrative purposes, pose initialization location 130 is depicted on a road near a crosswalk; however, as discussed in more detail below, pose initialization locations may be located anywhere a vehicle 102 may navigate (e.g., parking spaces in a parking lot, parking spaces proximate a road, warehouse facilities, charging stations/facilities, repair or services stations, a shoulder of a road, etc.).

In some examples, the perception component 110 may determine, based at least in part on sensor data, an object detection indicating an association of a portion of sensor data with an object in the environment. The object detection may indicate an object classification, a region of interest (ROI) identifying a portion of sensor data associated with the object, and/or a confidence score indicating a likelihood (e.g., posterior probability) that the object classification is correct and/or a confidence score that the ROI is accurate. For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, velocity, acceleration, and/or heading of that object.

The data produced by the perception component 110 may be collectively referred to as perception data. Once the perception component 110 has generated perception data, the perception component 110 may provide the perception data to the localization component 120 and/or the planning component 114. The perception data may additionally or alternatively be stored in association with the sensor data as log data. This log data may be transmitted to the planning component 114, which may execute on the computing device(s) 106 and/or at a remote computing device (unillustrated in FIG. 1 for clarity).

In at least one example, the localization component 120 may include hardware and/or software to receive data from the sensor(s) 104 and/or perception data to determine a position, velocity, and/or orientation of the vehicle 102 (e.g., one or more of an x-, y-, z-position, roll, pitch, or yaw). For example, the localization component 120 may include and/or request/receive map data 118 of an environment and can determine a location, velocity, and/or orientation of the autonomous vehicle within the environment. The localization component 120 may additionally or alternatively implement the techniques of the pose initialization as discussed herein. For example, the localization component 120 may determine that the vehicle 102 is located at or near (e.g., within a threshold distance) a pose initialization location, such as pose initialization location 130, and may retrieve a geolocation associated with the pose initialization location 130. The localization component 120 may then use the map data 118 to determine a relative position of the vehicle 102 to the geolocation associated with the pose initialization location 130. The localization component 120 may use this relative position of the vehicle 102 to the geolocation of the pose initialization location 130 to determine a geolocation and/or orientation of the vehicle 102 as the initial pose of the vehicle 102. In some examples, the localization component 120 may use trajectories generated by the planning component 114, sensor feedback from wheel encoder(s) and/or a steering rack of the vehicle 102, and/or other sensor data to track progress of the vehicle 102 from the initial pose.

For example, the localization component 120 may track progress of the vehicle 102 as it moves through the environment as a pose graph (e.g., a series of pose(s) in time and/or distance). While the vehicle 102 is executing a trajectory, sensor(s) of the vehicle 102 may collect sensor data, such as lidar data, radar data, image data, odometry data, inertial data, and/or the like. In some examples, the localization component 120 may determine a pose graph based at least in part on odometry data, inertial data, and/or other sensor data (e.g., camera, lidar, radar) and may associate collected sensor data with respective nodes. This association of a set of sensor data with a pose node of the pose graph may indicate that the set of sensor data was collected within a time window or position range of the pose indicated by the pose node. Additionally or alternatively, the localization component 120 may fit sensor data to map data associated with a current estimated pose of the vehicle to corroborate or correct an estimated pose of the vehicle to ensure the pose(s) indicated in the pose graph are accurate. In some examples, this iterative and ongoing determination of pose(s) of the vehicle over time may be based at least in part on the initial pose determined by the localization component 120.

The planning component 114 may use the perception data received from perception component 110 and/or the initial pose and/or pose graph generated by the localization component to determine one or more trajectories, control motion of the vehicle 102 to traverse a path or route, and/or otherwise control operation of the vehicle 102, though any such operation may be performed in various other components (e.g., localization may be performed by a localization component 120, which may be based at least in part on perception data). For example, the planning component 114 may determine a route for the vehicle 102 from a first location to a second location; generate, substantially simultaneously and based at least in part on the perception data and/or pose graph, a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory of the vehicle 102 that may be used to generate a drive control signal that may be transmitted to drive components of the vehicle 102. For example, the trajectory determined by the planning component 114 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory may comprise a target heading, target steering angle, target steering rate, target position, target velocity, and/or target acceleration for the controller(s) 116 to track. In some examples, the trajectory may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the controller(s) 116 may comprise software and/or hardware for actuating drive components of the vehicle 102 sufficient to track the trajectory. For example, the controller(s) 116 may comprise one or more proportional-integral-derivative (PID) controllers.

Example Process

Figure 2A:
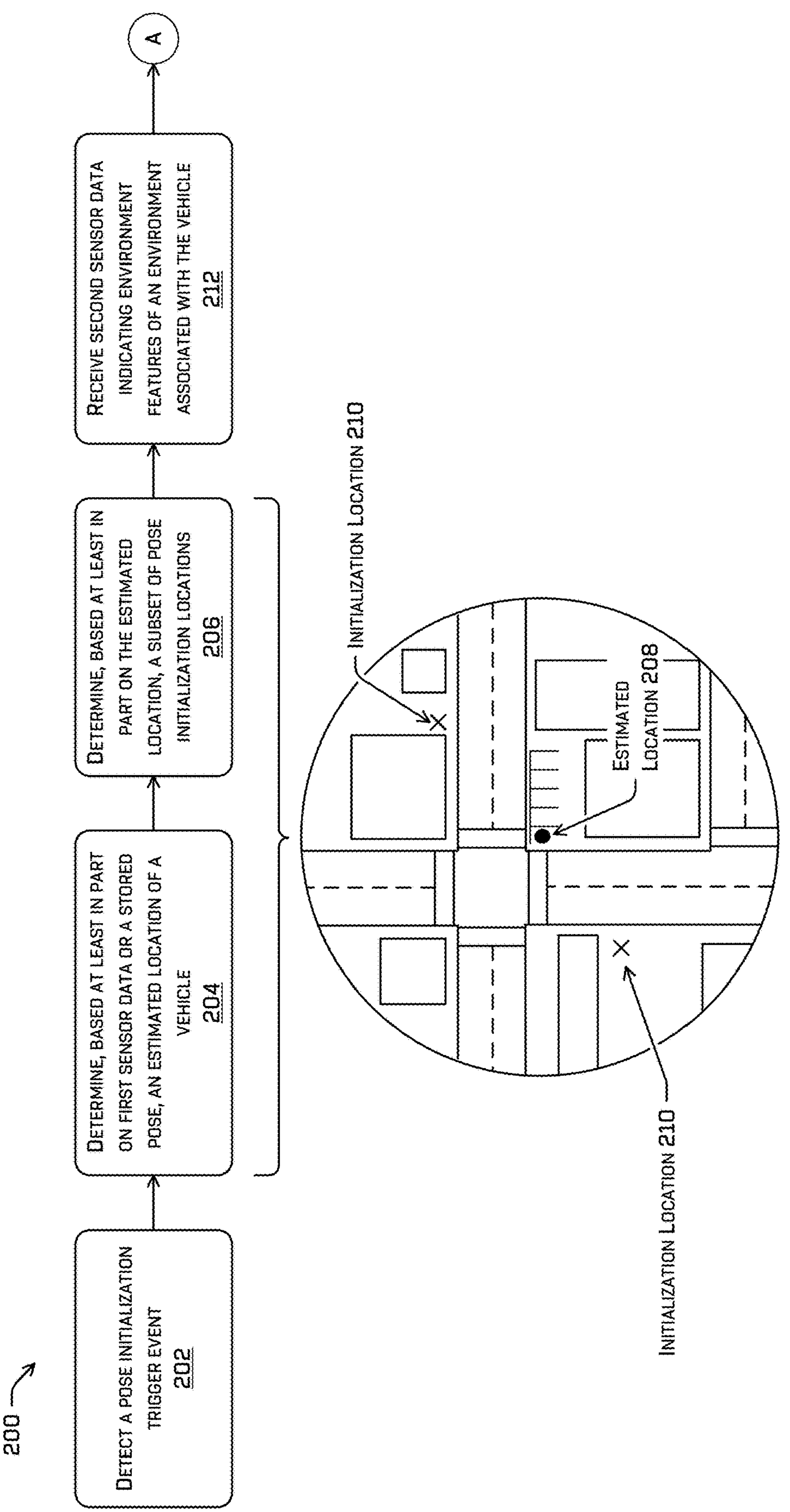
FIGS. 2A and 2B illustrate a pictorial flow diagram of an example process for initializing a localization component.
Figure 2B:
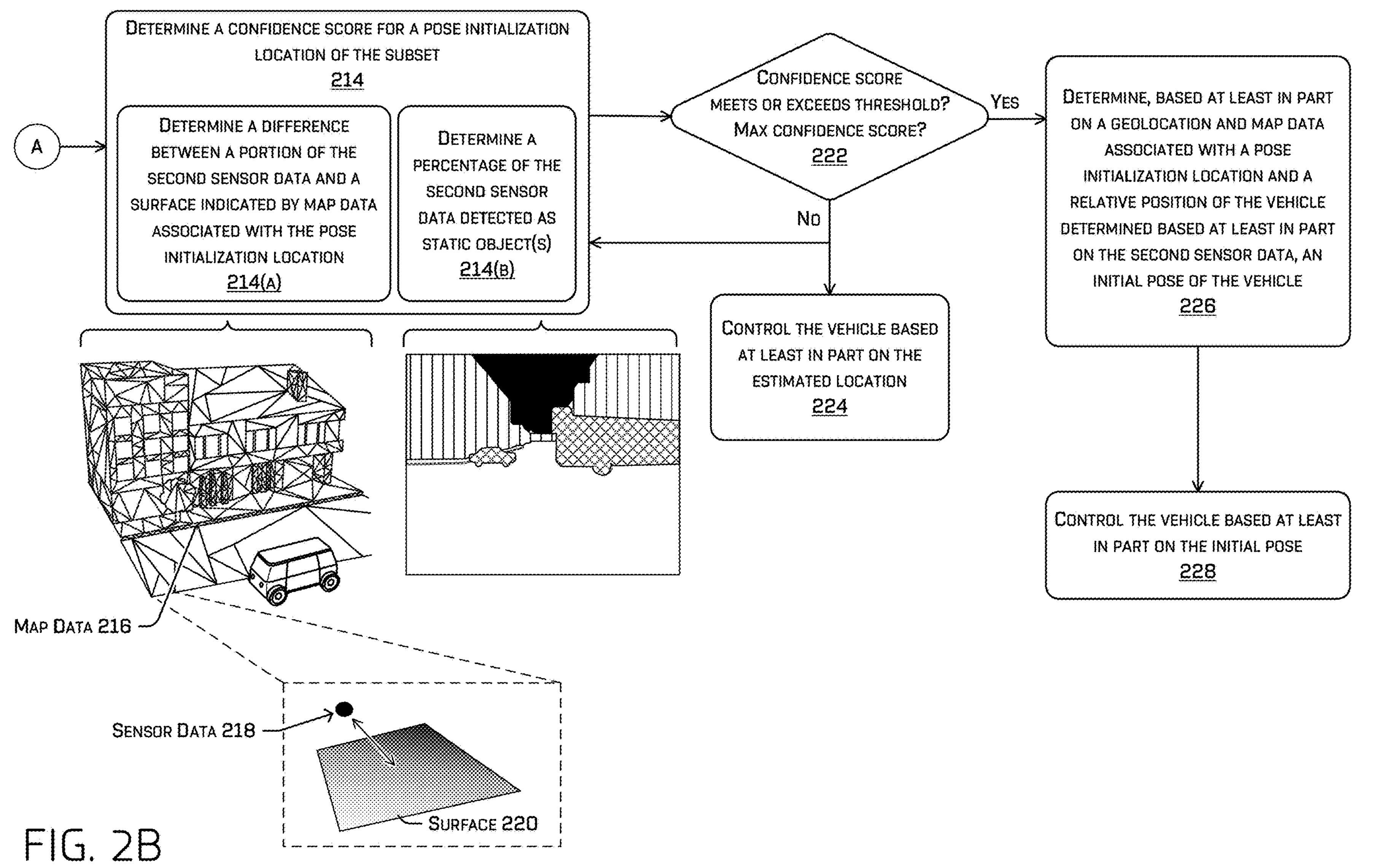

FIGS. 2A and 2B illustrate a pictorial flow diagram of an example process 200 of for initializing a localization component 120. In some examples, example process 200 may be executed by a vehicle 102. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, machine-learned models, and the like that perform particular functions or implement particular data types. The order in which the operations are described is not intended to be construed as a limitation, and any number of the described operations can be omitted or combined in any order and/or in parallel to implement the processes.

Turning to FIG. 2A, at operation 202, example process 200 may include detecting a pose initialization trigger event. As discussed briefly above, there are many events and/or reasons that a vehicle 102 may trigger a pose initialization. In some examples, the vehicle 102 may trigger a pose initialization based at least in part on detecting an event. For instance, the vehicle 102 may trigger a pose initialization after the vehicle 102 enters an operational mode or powers on after transitioning from a low power state or low operations mode. In some examples, a vehicle may trigger a pose initialization after the vehicle 102 returns to mission mode (e.g., after being powered off, after being in another mode such as a data collection mode, a network mesh mode, a diagnostic mode, or the like). The vehicle 102 may also execute a pose initialization after one or more of the vehicle's hardware or software components powers on from downloading an update or from powering off and powering back on, for example. In other examples, the vehicle 102 may trigger a pose initialization after one or more of the vehicle's components is damaged/impaired in transit (e.g., a sensor is obscured or impaired, an object impacts a portion of the vehicle), or otherwise has a component failure. In such a scenario, the pose initialization may correct and/or mitigate errors in the vehicle's pose or perception component 110, planning component 114, and/or localization component 120.

In other examples, the vehicle 102 may trigger a pose initialization to calibrate one or more sensor(s) 104 of the vehicle (e.g., fuse, mesh, or otherwise integrate/align data associated with one or more sensor(s) 104) or to mitigate any faults detected by the vehicle 102 or one or more of sensor(s) 104. Further, the vehicle 102 may trigger a pose initialization after detecting a charge event. In such an example, upon receiving sensor data associated with engaging and/or disengaging with a charging station or connection, the vehicle 102 may trigger a pose initialization while it is engaged with and/or after it disengages from the charger. In yet other examples, the vehicle 102 may detect a pose initialization trigger event based at least in part on a change of the vehicle's surroundings (e.g., when entering or exiting a parking garage, warehouse, tunnel, or other building/structure, entering or exiting a city alley or other constrained location, etc.). For instance, a vehicle 102 may execute a pose initialization after exiting an indoor parking garage and prior to navigating in the environment. In other examples, a vehicle 102 may trigger a pose initialization based at least in part on inclement weather and/or a change in weather. For instance, if a heavy fog rolls in or if the sun sets and the environment proximate the vehicle 102 changes in visibility, brightness, etc., the vehicle may trigger a pose initialization. Relatedly, if the vehicle 102 had previously been navigating with limited visibility (e.g., due to heavy rain, fog, snow, etc.), and the visibility improves or otherwise changes, the vehicle 102 may execute a pose initialization. Additionally or alternatively, a vehicle 102 may trigger a pose initialization during and/or after detecting a repair or diagnostic event. For example, after sending and/or receiving diagnostic data, and/or after undergoing a mechanical, electronic, and/or software repair or otherwise, remotely or manually, the vehicle 102 may trigger a pose initialization.

A vehicle 102 may additionally or alternatively execute a pose initialization based at least in part on receiving instructions to do so. For instance, a remote operator/teleoperator may send data associated with instructions to one or more vehicles (e.g., which may include vehicle 102) to execute a pose initialization procedure after the passage of a threshold amount of time or may do so before the one or more vehicles enter an operational mode and/or begin to navigate in an environment. Such a list of events/situations/reasons for a vehicle 102 to initialize its pose is by no means exhaustive, and there are many other events/situations/reasons contemplated herein that a vehicle may execute a pose initialization.

At operation 204, example process 200 may include determining, based at least in part on first sensor data and/or a stored pose, an estimated location 208 of a vehicle 102. In some examples, operation 204 may include determining the estimated location 208 based at least in part on sensor data received from a global positioning sensor, such as a GPS. Additionally or alternatively, when a vehicle 102 enters an operational mode (e.g., after charging, powering on, exiting a low operation/low power mode, undergoing repairs, or otherwise returning from cessation of a mode or operation of the vehicle 102), the vehicle 102 may initially determine whether the pose data that was collected or determined before it transitioned into a low operation state or low power mode is still accurate, such as by determining whether sensor data, such as first sensor data such as GPS data, indicates a position within a threshold distance of the stored pose data or that the first sensor data fits map data associated with the stored pose data. The vehicle 102 may do so by comparing the first sensor data with map data associated with a location indicated by the stored pose data to determine a confidence score. If the confidence score meets or exceeds a threshold confidence score or meets a maximum confidence score, the vehicle may use the stored pose as its initial pose (e.g., for further localization, perception, and/or planning operations of the vehicle.) The confidence score meeting or exceeding a threshold or meeting a maximum confidence score may indicate that the vehicle 102 has the same or similar pose as it did before it transitioned into a low operations state or low power mode and may accordingly use such pose as the vehicle's initial pose or at least its estimated location.

In some examples, a vehicle 102 may determine a confidence score associated with the vehicle's estimated location 208 that meets or exceeds a threshold but may further determine a confidence score associated with its stored pose data that fails to meet or exceed a confidence score threshold, thus indicating that the vehicle 102 has an accurate determination of its estimated location 208 but that the stored pose data is no longer valid. In such an example, the vehicle 102 may use its estimated location 208 to generate a pose initialization location 210 using the techniques described herein. As a more concrete example, a vehicle 102 may, before powering off or otherwise transitioning into a low operation state, store its estimated or precise location and map data associated therewith indicating the features of the environment at the estimated or precise location, thereby generating a unique pose initialization location. When the vehicle 102 powers on or otherwise transitions out of a low operation state, the vehicle 102 may use its stored location and/or stored map data and/or stored sensor data to execute a pose initialization at the unique pose initialization location previously generated. In such a situation, when two or more vehicles (e.g., a fleet) attempt to trigger and/or execute pose initializations simultaneously or in rapid succession, using unique pose initialization locations generated by the vehicle(s) prior to powering off may reduce and/or eliminate a queue/wait time by allowing each vehicle to execute its own pose initialization independently. Further, when one or more vehicle(s) use its/their unique pose initialization locations that each may have generated prior to powering off (or otherwise entering a low operation state), the number of pose initialization locations needed to initialize a plurality of vehicles (e.g., a fleet) may be reduced.

Additionally or alternatively, a vehicle 102 may determine its estimated location 208 based at least in part on first sensor data from one or more sensor(s) 104 of the vehicle 102. For example, if a vehicle 102 is towed and/or maneuvered (manually or remotely) while it is powered off or while it is in a low operation/low power mode, or if an operator manually maneuvers a vehicle outside of a specified map radius, the stored location and/or pose data may no longer be accurate. For example, if an operator remotely or manually controlled a vehicle 102 while it was powered off, when the vehicle 102 powers on, it may determine a confidence score associated with its saved pose data that may fall below a confidence score threshold, indicating that the vehicle 102's saved pose data is invalid or otherwise inaccurate. In such an example, the vehicle 102 may receive first sensor data from one or more sensor(s) 104 to determine its estimated location 208. For example, the vehicle 102 may receive first sensor data from one or more sensor(s) 104 associated with a location (e.g., compass data, global positioning satellite (GPS) data, inertial measurement data), that the vehicle may use to determine its estimated location 208. Using first sensor data from one or more sensor(s) 104 may assist the vehicle 102 determine its estimated location 208 if the pose data stored by vehicle 102 is invalid, for example.

In at least some examples, the first sensor data may be associated with one or more features of the environment proximate the vehicle 102. In some examples, the one or more features of the environment may include an indicator that may be a unique identifier. The indicator or unique identifier may be, for example, a retrievable identification number, a quick-response (QR) code, a barcode, other similar fiducial marker, and/or a network device transmitted code (e.g., Near Field Communication (NFC), Radio Frequency Identification (RFID), ultra-high frequency radio (e.g., Bluetooth®), Wi-Fi, wireless local area network (WLAN), low-rate wireless personal area network (LR-WPAN), Long-Range Wide Area Network) that may be associated with a particular location. As a more concrete example, the vehicle 102 may receive image sensor data of a QR code proximate the vehicle 102 which may be affixed to an object having a geolocation (or other data) associated therewith that is recorded in a database accessible to the vehicle 102 (e.g., in a memory of the vehicle 102 or in a database the vehicle 102 can access via an API call). The vehicle 102 may navigate to the geolocation associated with the indicator or unique identifier, for example, to execute a pose initialization procedure according to the techniques described herein.

In other examples, the first sensor data may be received from one or more emitters, such as a sound emitter (e.g., ultrasonic emitter), electromagnetic emitter (e.g., millimeter wave, radio frequency, microwave, infrared, visible light), or the like that a vehicle 102 may use to determine an estimated location 208. In such examples, the vehicle 102 may determine an estimated location based at least in part on a location of one or more electromagnetic emitters. The vehicle 102 may use one or more of map data 118 and/or first sensor data to determine a location of the one or more electromagnetic emitters. The vehicle 102 may receive second sensor data (i.e., an ultrasonic sensor, etc.) associated with the one or more electromagnetic emitters. The first sensor data associated with the one or more electromagnetic emitters may be encoded with information (e.g., an estimated location 208, an estimated and/or precise pose), that the vehicle 102 may use to determine an estimated location 208. The vehicle 102 may additionally or alternatively authenticate the first sensor data associated with the one or more electromagnetic emitters. As a more concrete example, a warehouse depot or charging station may include one or more ultrasonic emitters. The vehicle 102 may use first sensor data (i.e., that the vehicle 102 received from one or more ultrasonic sensors) to execute an ultrasonic handshake with the one or more ultrasonic emitters on or near the warehouse depot or charging station, wherein the first sensor data may be encoded with and/or may indicate an estimated location 208 and/or an estimated or precise pose of the vehicle 102 that may be relative to the one or more ultrasonic emitters.

In some examples, the vehicle 102 may determine an estimated location 208 based at least in part on a cellular or network triangulation. In such an example, one or more sensor(s) 104 of the vehicle 102 may transmit or receive data associated with an estimated location 208 and/or an estimated distance from one or more cell towers or one or more network devices. For instance, the vehicle 102 may receive and/or transmit (e.g., ping) data to/from one or more network devices or cell towers, and based at least in part on a distance, time, latency, strength (e.g., signal-to-noise ratio, power) of a signal from a network transmitter or similar characteristic of the data transmission to/from the one or more network devices or cell towers, the vehicle 102 may determine the vehicle's estimated location 208.

At operation 206, example process 200 may include determining, based at least in part on the estimated location 208 of the vehicle 102, a subset of pose initialization locations. As shown in FIG. 2A, pose initialization locations may be predetermined locations in a city, region, and/or an environment where a vehicle 102 may execute a pose initialization. For example, pose initialization locations may be located at or near charging stations/bases, in or around maintenance and/or service stations, at a command/control center, or at other accessible locations in an environment, such as specific parking spots. Pose initialization locations may be predetermined locations with unique and/or distinct features/characteristics/surroundings (as determined by a sufficient difference between map data 118 associated with the different pose initialization locations, discussed in more detail below) such that a vehicle 102 may compare sensor data of the vehicle's proximate environment with map data 118 of the predicted surroundings of the pose initialization location 210 in order to accurately localize. In some examples, each pose initialization location may have a unique geolocation and unique map data associated therewith that a vehicle can use to determine a relative global pose of the vehicle.

As a more concrete example, a pose initialization location 210 may be located in between two buildings, each of which has unique features such that the pose initialization location 210 may be distinguished from the environment proximate each building. In another example, a pose initialization location 210 may be at a location that a vehicle 102 may be frequently nearby. For instance, a pose initialization location 210 may be located at or near a charging location and/or a maintenance/service location. Additionally or alternatively, prior to powering off or entering a low operation/low power mode, a vehicle 102 may create its own unique pose initialization location for use upon powering on or entering an operational mode. In other words, a vehicle 102 may be able to store map data 118 and/or sensor data associated with the features of the environment proximate the vehicle 102 prior to powering off, rebooting, or the like. By doing so, the vehicle 102 may create its own pose initialization location 210 that it may use upon powering on or entering an operational state. For example, if a vehicle accurately determines and stores the map data 118 and/or sensor data associated with the environment proximate the vehicle, when the vehicle powers on, it may compare its map data 118 and/or sensor data to the stored map data 118 and/or the stored sensor data associated with the surroundings/features of the environment proximate the vehicle 102 prior to powering off, thereby determining a confidence score associated with the accuracy of the saved pose data.

Additionally or alternatively, to determine a subset of pose initialization locations, the vehicle 102 may receive data associated with and/or determine the vehicle's estimated location 208 and then incrementally search its environment with an expanding radius (e.g., first a radius of 10 meters, then 50 meters, then 100 meters, and so on) from the estimated location 208 until the vehicle determines a subset of candidate pose initialization locations. For example, the vehicle 102 may incrementally increase the radius until the number of candidate pose initialization locations in the subset meets or exceeds a threshold number. As depicted in FIG. 2A, from the vehicle's estimated location 208, the vehicle may search a predetermined radius (e.g., 10 meters, 100 meters, 300 meters) to determine a subset of pose initialization locations within the predetermined distance of the vehicle. In such an example, if the vehicle 102 does not locate any pose initialization locations or does not locate any accessible/viable pose initialization locations, the vehicle 102 may then increase the predetermined radius and repeat its search within the increased radius. Such a search may be repeated one or more times until a subset of pose initialization locations is determined.

Additionally or alternatively, a vehicle 102 may receive a subset of pose initialization locations from a set of pose initialization locations provided by a remote operator or retrievable database that may be based at least in part on the vehicle's estimated location 208. In such an example, the vehicle 102 may have failed to determine a subset of pose initialization locations, or it may be quicker and/or more efficient to retrieve the subset of pose initialization locations from a remote database or remote operator. In other examples, the vehicle 102 may be unable to determine an estimated location of the vehicle and accordingly may not effectively search a predetermined radius (e.g., due to inclement weather, a lack of network connectivity, one or more compromised components, tall buildings and/or a convoluted environment.). In such an example, the vehicle 102 may instead send a request to and/or receive data from a remote computing device associated with a remote operator and/or a retrievable database associated with a subset of pose initialization locations. In such examples, the subset of pose initialization locations may be based at least in part on the availability of individual pose initialization locations of the subset. Whether or not an individual pose initialization location is available may be based at least in part on whether a vehicle 102 is permitted to use the pose initialization location. In other words, the availability of an individual pose initialization location may be based on whether it is physically feasible for a vehicle 102 to occupy the pose initialization location (e.g., there are sufficient navigable roadways that the vehicle 102 may use to plan a path to a pose initialization location 210, a legally available parking spot exists at the pose initialization location 210, sufficient physical space exists at the pose initialization location 210 as indicated by most recently updated map data 118 (e.g., excluding one or more dynamic objects that may occupy the area), etc.). For example, if a pose initialization location 210 of the subset is in a construction zone and there are no navigable roads to it, the pose initialization location 210 may be removed from the subset of pose initialization locations as being inaccessible.

Additionally or alternatively, if the vehicle 102 is unable to receive location data or is unable to receive a subset of pose initialization locations and the vehicle's stored pose data is inaccurate or the vehicle 102 lacks a sufficient confidence score associated with its stored pose data, the vehicle 102 may use its last saved location to determine an estimated location 208. In such an example, the vehicle 102's last saved location may be used as its estimated location 208 to determine a subset of pose initialization locations. As a more concrete example, if the vehicle 102 is parked in a parking garage underneath a building and both the vehicle's saved location and pose data is inaccurate and it is unable to receive data associated with its estimated location 208 (e.g., due to a lack of network connectivity or otherwise), the vehicle 102 may search a predetermined radius around its last saved location to determine a subset of pose initialization locations. Additionally or alternatively, the vehicle 102 may determine a subset of pose initialization locations based at least in part on a region the vehicle 102 is assigned to operate within.

As depicted in FIG. 2A, the vehicle 102 may determine a subset of pose initialization locations that includes one or more pose initialization locations. The vehicle 102 may determine, based on one or more of an accessibility, a location, and/or a distance, which one of the pose initialization locations of the subset is the most efficient/viable. A vehicle 102 may additionally or alternatively receive data from a remote operator and/or a retrievable database associated with an individual pose initialization location of the subset based on one or more of the factors listed above. For example, a vehicle 102 may receive, from a remote operator, data indicating that pose initialization location A is unavailable (e.g., due to construction, traffic, a blockage, weather), and may remove pose initialization location A from the subset, and may further instruct or otherwise notify the vehicle 102 that pose initialization location B is the most efficient/ideal of the subset due to the unavailability of location A.

At operation 212, example process 200 may include receiving second sensor data indicating environment features of an environment associated with the vehicle 102. For example, the vehicle 102 may receive sensor data from any one or more of sensor(s) 104 that may be associated with one or more features of the environment proximate the vehicle 102. In some examples, the second sensor data may be used to localize the vehicle using an indicator that is indicated in the second sensor data and/or by using comparing the second sensor data to map data associated with a pose initialization location. For example, the vehicle 102 may receive image, radar, lidar, or other sensor data that may include an indicator associated with a feature of the environment proximate the vehicle 102. In such an example, the indicator may be a unique identifier associated with a feature of the environment and/or with a global/regional pose. The unique identifier may be, for example, a retrievable identification number, a quick-response (QR) code, a barcode, other similar fiducial marker, and/or a network device transmitted code (e.g., Near Field Communication (NFC), Radio Frequency Identification (RFID), Bluetooth, Wi-Fi, wireless local area network (WLAN), Zigbee, Z-Wave, Long-Range Wide Area Network, Thread, Sigfox). As a more concrete example, the vehicle 102 may receive image sensor data of a QR code proximate the vehicle 102 which may be affixed to an object having a global pose associated therewith that is recorded in a database accessible to the vehicle 102 (e.g., in a memory of the vehicle 102 or in a database the vehicle 102 can access via an API call).

The second sensor data may additionally or alternatively be associated with and/or indicate a physical object of an environment proximate the vehicle 102 that has features and/or properties that are unique to the physical object (e.g., a building, a building feature, a road feature, an art installation, a rock or similar natural object, etc.). In such an example, a vehicle 102 may receive second sensor data (e.g., lidar, radar, image, etc.) from one or more sensor(s) 104 associated with a physical object with unique or distinct physical features and may determine its estimated location 208 and/or its pose data based at least in part on the second sensor data. Additionally or alternatively, a vehicle 102 may receive second sensor data while the vehicle is oriented in one or more directions/headings. For example, a vehicle 102 may first receive second sensor data while the vehicle 102 is in a first orientation and may additionally or alternatively receive second sensor data while the vehicle 102 is in a second orientation, the second orientation being different than the first.

In some examples, the unique identifier, indicator, or environment feature may be associated with a particular location and/or feature of the environment proximate the vehicle 102. For instance, the environment feature may be located on a permanent structure (e.g., a façade and/or exterior or interior wall/face of a building, a road surface, median, curb, shoulder, sign, billboard, post, or the like) that may be proximate the vehicle 102. For purposes of illustration and not limitation, the environment feature may be on a charging station, on the pavement surface of a parking location in front of a charging station, on an exterior-facing wall of a maintenance facility or service station, or other similar location. In at least some examples, the environment feature may be a temporary environment feature with unique features (e.g., a tree or other plant, a banner and/or sign, a flag, etc.).

In an additional or alternate example, multiple vehicles may receive second sensor data of the same or similar environment feature or indicator. In an example where multiple individual vehicles receive different second sensor data of the same unique environment feature or indicator, an individual vehicle may determine its initial pose based on a relative difference between its second sensor data and the second sensor data received by the other individual vehicles. In other examples, an indicator and/or unique identifier may be displayed in a location that a vehicle 102 may navigate (e.g., above a road, on the pavement surface at a stop light/stop sign, etc.) such that the vehicle 102 may receive second sensor data associated with the indicator/unique identifier while navigating an environment.

In an example where the vehicle determines that the second sensor data comprises an indicator or unique environment feature, example process 200 may skip to operation 226 and use a geolocation associated with the indicator or unique environment feature to determine an initial pose of the vehicle.

Turning to FIG. 2B, at operation 214, example process 200 may include determining a confidence score for a pose initialization location 210 of the subset of pose initialization locations. In some examples, each pose initialization location of the subset may have map data associated therewith. Operation 214 may be part of an iterative process to determine which pose initialization location the vehicle 102 is located at. For example, example process 200 may iteratively perform operation 214(*a*) and operation 214(*b*) using the different map data associated with each pose initialization location of the subset until the condition at operation 214 is satisfied.

Operation 214 may, in some examples, include operation 214(*a*), which may comprise determining a difference between a portion of the second sensor data and a surface 220 indicated by map data 216 associated with the pose initialization location 210 of the subset. In some examples, operation 214 may additionally or alternatively include operation 214(*b*), which may include determining a percentage of the second sensor data detected as being static object(s). As depicted in FIG. 2B, the map data 216 may include, for example, geometric data indicating a previously stored representation of surfaces in the environment at the pose initialization location 210. The geometric data may identify a location, dimensions, shape, and/or label associated with static features of the environment. In some examples, the location, dimensions, and/or shapes indicated by the geometric data may be three-dimensional. This map data may have previously been generated using a combination of sensor data collected from a vehicle and labelling of such data using machine-learned model(s) and/or human labelling. For example, a label may include a semantic label and may indicate that a portion of the geometric data is associated with a static object classification, such as a ground plane, roadway/drivable surface, building, signage, or various other static objects (e.g., mailbox, fountain, fence). The geometric data may include a data structure identifying features of the environment, such as a polygon representation, mesh representation, wireframe representation, or the like. For example, FIG. 2B includes an example of geometric data that includes mesh. A mesh may comprise vertices and faces therebetween that define surfaces in the environment. In an additional or alternate example, the map data 216 may include simpler canonic geometric shapes, such as a variety of archetypical building shapes, scenes, roadways, intersection, signage shapes, bench or other static object shapes, roadway shapes, sidewalk shapes, and/or the like. For example, a variety of different canonic signage shapes may be used to represent different signage.

Operation 214(*a*), may, for example, include determining a portion of the second sensor data attributable to static objects in the environment proximate the vehicle 102. For example, the depicted sensor data 218 may be part of the second sensor data, such as a lidar point that is part of a lidar point cloud. In some examples, operation 214(*a*) may include determining that the lidar point is associated with a static object by projecting the lidar point into an image space and determining that the projected point is within a portion of an image segmentation identified as being associated with a static object. Such an image segmentation may be determined by the perception component of the vehicle and may include an instance segmentation, semantic segmentation, or the like. By doing so, the vehicle 102 may remove (i.e., filter out) the dynamic objects in the environment (e.g., pedestrians, vehicles, animals, bicycles, etc.) to increase the accuracy of comparing the second sensor data to the one or more surfaces 220 indicated by map data 216. The portion of the second sensor data attributable to static objects may be projected onto and/or rendered into a three-dimensional voxel space, in some examples. By way of example, after receiving lidar and/or radar sensor data attributable to one or more static objects proximate the vehicle 102 as second sensor data, the second sensor data may then be projected onto a voxel space, wherein each portion of the second sensor data may be represented by an individual voxel in the voxel space. For example, in the case of lidar sensor data, each data point of a lidar point cloud may represent a measurement of distance as well as spatial coordinates (e.g., on an x-axis, y-axis, and z-axis) of the data point, which may be mapped onto the voxel space.

Once second sensor data detected as being associated with dynamic object(s) has been filtered out, operation 214(*a*) may further comprise determining a difference between the second sensor data and surface(s) indicated in the map data 216. For example, operation 214(*a*) may comprise determining an average Euclidean or other distance between portions of sensor data and a surface indicated by the map data 216. FIG. 2B depicts one such distance as a double arrow-headed line between sensor data 218 and surface 220. Additionally or alternatively determining the difference between the second sensor data and the map data may be part of an optimization that fits the second sensor data to the map data, which may comprise iteratively changing an estimated relative pose of the vehicle 102 to the map data 216 and updating an average distance between the second sensor data and the surface(s) 220 indicated in the map data 216. For example, the optimization may comprise a Monte Carlo algorithm, such as a particle filter, various SLAM (simultaneous localization and mapping) algorithms, scan matching (e.g., iterative closest point, etc.), least squares, various sensor fusion architectures (e.g., sensor fusion ecosystems, sensor fusion centers), or the like to minimize discrepancies between the second sensor data and the map data 216. In some examples, the optimization algorithm may iteratively modify the pose of the vehicle until a convergence condition is satisfied (e.g., the average Euclidean distance between points in the portion of second sensor data to their closest respective surfaces indicated in the map data is below a threshold average distance, a gradient indicating a rate of change of the average distance is less than a threshold gradient) or a number of iterations meets or exceeds a threshold number.

In some examples, the difference between a portion of the second sensor data and a surface 220 indicated by map data 216 associated with the pose initialization location 210 may be determined based at least in part on an average distance (e.g., average Euclidean distance, average Manhattan distance, etc.) between the portion of second sensor data (e.g., a lidar point, an occupied voxel (as determined using lidar, radar, stereo camera, or time-of-flight), a radar return) and the closest surface(s) 220 to such point(s) indicated by the map data 216. In some examples, this average distance or a fit value determined by an optimization algorithm, such as an R-value, may be used to determine the confidence score or may be used as the confidence score. Additionally or alternatively, such a difference may be normalized and/or standardized (e.g., min-max scaled, z-score standardized, normalized by feature scaling, etc.) as the confidence score. In some examples, the distances between the portion of second sensor data and one or more surface(s) may be normalized such that the score may be between 0 and 1. In such an example, a distance between a portion of the second sensor data and a surface that is represented by a number close to 1 may indicate a shorter distance between the portion of second sensor data and the surface 220 and a number equal to 1 indicates that the second sensor data point is collocated at the surface 220. Similarly, a longer distance between the second sensor data and a surface 220 may be represented by a number closer to 0. The aggregate distances may be averaged and/or normalized and/or distributed according to any of the techniques discussed herein. In other examples, the distances between the second sensor data and the one or more surface(s) 220 may be distributed according to one or more distribution algorithms (e.g., Gaussian, Gamma, Cauchy).

Additionally or alternatively, operation 214 may comprise an ultrasonic or other electromagnetic handshake between a vehicle 102 and one or more ultrasonic or other electromagnetic emitters in the environment proximate the vehicle 102. For example, a vehicle 102 may receive second sensor data associated with one or more ultrasonic emitters that may be encoded with data (e.g., location data, data associated with one or more pose initialization locations). A vehicle 102 may determine a location of one or more ultrasonic emitters based at least in part map data, and may use the location of the one or more ultrasonic emitters to determine a confidence score associated with a pose initialization location. In some examples, the vehicle may determine a maximum confidence score associated with a pose initialization location based at least in part on an ultrasonic handshake.

At operation 214(*b*), determining a confidence score associated with a pose initialization location 210 of the subset may further comprise determining a percentage of the second sensor data detected as static object(s). For example, the confidence score discussed above may be a preliminary confidence score that is multiplied by a percentage of second sensor data attributable to static objects to determine the final confidence score. This final confidence score may indicate a fit of the sensor data to the map data for the pose initialization location and, by proxy, a likelihood that the vehicle is located at or near the pose initialization location. If the percentage of the second sensor data associated with static objects is low, indicating there are few static objects in the environment proximate the pose initialization location 210, the confidence score associated with the pose initialization location 210 of the subset may be low. Conversely, if the percentage of second sensor data associated with static objects is high, indicating that there are many static objects in the environment proximate the vehicle 102, the confidence score associated with the pose initialization location 210 of the subset may be high. As a more concrete example, if a vehicle 102 is parked on a busy street and is surrounded by dozens or hundreds of people, the percentage of second sensor data associated with static objects may be relatively low, and accordingly the confidence score determined for the pose initialization location 210 of the subset may be relatively low. As depicted in FIG. 2B, static objects detected by the second sensor data may be represented by vertical hatching (or, e.g., a first color/gradient/pattern etc.), whereas dynamic objects may be represented by diagonal hatching (or, e.g., a second color/gradient/pattern).

Operation 214 of example process 200 may be repeated iteratively for each pose initialization location 210 of the subset or until the confidence score associated with one of the pose initialization locations meets or exceeds a threshold confidence score. As in previous examples and as depicted in FIG. 2A, if the subset of pose initialization locations comprises at least two pose initialization locations, operation 214 of example process 200 may iteratively determine a confidence score associated with each pose initialization location 210 of the subset. If a confidence score associated with a pose initialization location 210 of the subset meets or exceeds a confidence score threshold and/or is a maximum confidence score, as depicted at operation 222 of example process 200, thus indicating that the vehicle 102 is likely located at the pose initialization location 210, the vehicle 102 may then execute a pose initialization as described at operation 226. Additionally or alternatively, instead of iteratively determining a confidence score for each pose initialization location, if a confidence score associated with a pose initialization location 210 of the subset is a maximum confidence score, it may indicate that the vehicle is located at the pose initialization location 210, and the vehicle 102 may not determine a confidence score for the remainder of pose initialization locations of the subset. Additionally or alternatively, operation 222 may comprise determining a maximum confidence score from among the confidence scores determined for the different pose initialization locations and using the pose initialization location associated with the maximum confidence score for the pose initialization at operation 226. This may be useful in an instance where the vehicle 102 is located at a pose initialization location with a high number of dynamic objects, which may cause the confidence score associated therewith to be lower despite being the correct pose initialization location. In some examples, at operation 222, the vehicle 102 may make incremental movements to try to increase the confidence score. For example, the vehicle 102 may turn and/or reposition itself by small angles and/or distances to find an optimal or improved confidence score associated with a pose initialization location 210.

In some examples, if the confidence score determined for each pose initialization location 210 of the subset fails to meet or exceed a confidence score threshold, the vehicle may, as depicted at operation 224, control the vehicle 102 based at least in part on the estimated location 208. For purposes of illustration and not limitation, in the event that a vehicle 102 determines a confidence score for one or more pose initialization locations that each fails to meet or exceed a confidence score threshold, the vehicle 102 may determine that it is not located at any pose initialization location 210 of the subset. In such a case, the vehicle 102 may navigate, autonomously, manually, or remotely via a remote operator, to a pose initialization location 210 of the subset, at which point the vehicle 102 may again determine a confidence score for the pose initialization location 210. In at least some examples, the vehicle 102 may continuously execute operation 214 while it is navigating to a pose initialization location 210 or elsewhere. In other words, while the vehicle 102 may be in transit or otherwise en route to a pose initialization location 210 as discussed herein, the vehicle 102 may repeatedly or iteratively determine a difference between a portion of the second sensor data and one or more surface(s) 220 indicated by map data 216, and/or may determine a percentage of the second sensor data that may be associated with static objects. Additionally or alternatively, in the event that a vehicle 102 determines a confidence score for each pose initialization location of the subset that each fails to satisfy a threshold confidence score, the vehicle may remain stationary and continue to iteratively determine a percentage of the second sensor data that may be associated with static objects. This may be the case, for example, if the vehicle 102 determines a relatively low percentage of the second sensor data that is associated with static objects (or, e.g., determines a percentage of second sensor data that fails to meet or exceed a threshold percentage), thus indicating that the vehicle 102 is surrounded by a crowd of pedestrians or other dynamic objects, for instance. In such an example, the vehicle 102 may remain stationary and may continuously or repeatedly execute one or more of operations 214(*a*) and/or 214(*b*) until the percentage of second sensor data that is associated with static objects meets or exceeds a threshold percentage.

Additionally or alternatively, a vehicle 102 may determine that it is located at a pose initialization location 210 by determining that the average Euclidean distance (or another measure of comparison discussed herein, such as a confidence score) or fit value determined by an optimization algorithm is less than an average Euclidean distance threshold (or for a confidence score or fit value, above a confidence score threshold or fit value threshold) or is the minimum average Euclidean distance (or maximum confidence score) from among multiple averages/confidence scores determined by comparing the second sensor data to the map data 216 of different pose initialization locations of the subset.

Additionally or alternatively, if a confidence score determined for a pose initialization location 210 meets or exceeds a maximum confidence score, thus indicating that the vehicle 102 has accurately determined that it is located at the pose initialization location 210, the vehicle 102 may execute a pose initialization, as discussed in more detail below. This may be the case, for example, if a vehicle 102 receives first or second sensor data associated with a QR code or other unique identifier or indicator as discussed above. In such a scenario, the vehicle 102 may not iteratively determine a confidence score for each pose initialization location 210 of the subset because the confidence score meeting or exceeding a maximum confidence score may accurately indicate that the vehicle 102 is located at the pose initialization location 210.

Additionally or alternatively, an initial pose of a vehicle 102 may be determined based at least in part on an ultrasonic or other electromagnetic handshake, as discussed herein. For example, a vehicle 102 may receive second sensor data from one or more ultrasonic emitters in an environment proximate a vehicle 102. Such second sensor data may be sufficiently accurate and/or may comprise data that conveys an initial pose of the vehicle 102 that may meet or exceed a threshold confidence and/or accuracy threshold. The vehicle 102 may additionally or alternatively determine, based at least in part on the locations of and/or data associated with the one or more ultrasonic sensor(s), a pose relative to the one or more ultrasonic sensor(s).

At operation 226, example process may include determining, based at least in part on a geolocation and map data associated with a pose initialization location 210 and a relative position of the vehicle 102 determined based at least in part on the second sensor data, an initial pose of the vehicle. For example, the vehicle 102 may retrieve and/or receive a geolocation associated with the pose initialization location and may determine a relative pose of the vehicle to the geolocation using the second sensor data and the map data associated with the pose initialization location. This may include a Monte Carlo method or similar algorithm to determine a pose of the vehicle that fits the second sensor data to the map. This pose may be determined as a relative offset from the geolocation associated with the pose initialization location. For example, the offset may indicate a lateral, longitudinal, and/or angle offset from the geolocation associated with the pose initialization location. This offset may be used to determine a global pose of the vehicle 102 that the vehicle 102 may use as the initial pose of the vehicle. The geolocation may additionally or alternatively represent global coordinates (e.g., latitude and longitude coordinates), map coordinates, vehicle 102-centric coordinates, and/or the like. The geolocation may be received by the vehicle 102 (e.g., from a teleoperator, a retrievable database, a simulated environment) rather than determined by the vehicle 102. For example, a vehicle 102 may receive Cartesian coordinates associated with defined coordinate frame in a simulation or otherwise and may further determine or receive a geolocation based at least in part on the Cartesian coordinates and/or the defined coordinate frame. Additionally or alternatively, the initial pose of the vehicle may be determined without the use a geolocation, and instead may be determined based on map data associated with a pose initialization location and a relative position of the vehicle determined based at least in part on the second sensor data.

At operation 228, example process 200 may include controlling the vehicle 102 based at least in part on the initial pose determined at operation 226, according to any of the techniques discussed herein. For example, one or more computing devices 106 of the vehicle 102 may rely at least in part on an accurate determination of the initial pose of the vehicle 102. In some examples, controlling the vehicle 102 based at least in part on the initial pose comprises using the initial pose to at least one of track progress of the vehicle 102 in the environment or determine a trajectory for controlling the vehicle based at least in part on the vehicles' 102 initial pose. In at least one example, the localization component 120 may include hardware and/or software to receive data from the one or more sensor(s) 104 of the vehicle 102 to implement the techniques discussed herein. In such an example, the localization component 120 may determine a position, velocity, and/or orientation of the vehicle 402 (e.g., one or more of an x-, y-, z-position, roll, pitch, or yaw), according to one or more of the techniques discussed herein.

Figure 3:
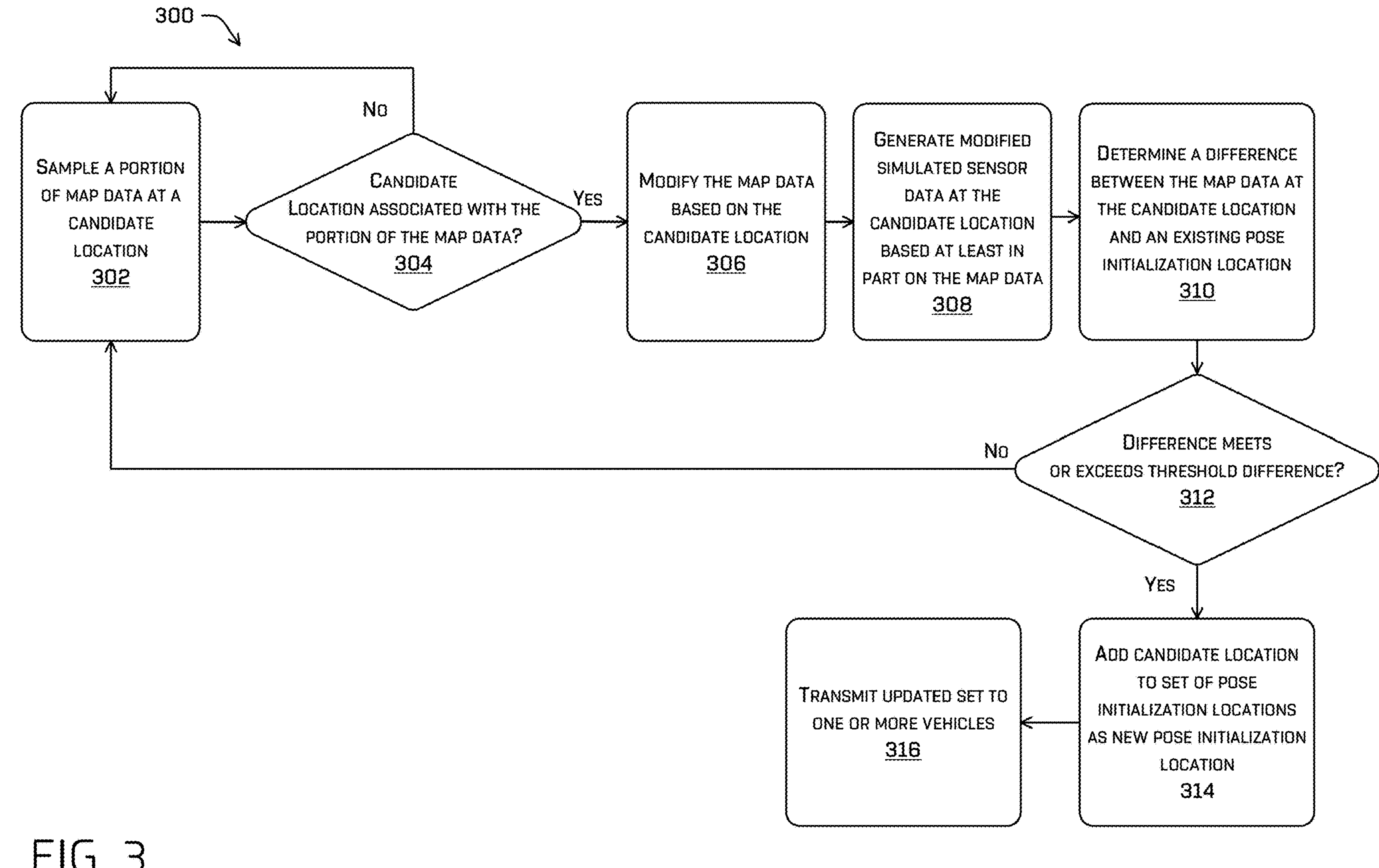
FIG. 3 illustrates a pictorial flow diagram of an example process for generating a new pose initialization location based at least in part on comparing map data at a location or simulating sensor data at the location with map data at another location or a simulation of sensor data received at the other location.

FIG. 3 illustrates a pictorial flow diagram of an example process 300 for generating a pose initialization location 210. In some examples, example process 300 may be a simulated process executed by a remote computing device for adding new pose initialization location(s) to a set of pose initialization locations. Example process 300 may be based at least in part on comparing map data at a first location or simulating sensor data at the first location with map data at a second location or a simulation of sensor data received at the second location. In such an example, the first location may be a candidate location for addition to the set of pose initialization locations and the second location may be an existing pose initialization location in the set. The comparison may be used to determine a level of distinctiveness of environment features at the candidate location from environment features at each of the existing pose initialization locations in the set. In some examples, this comparison may occur for all pose initialization locations within a region, such as an operational region to which a vehicle may be assigned (e.g., a particular city or part of a city) or based on a maximum distance at which a vehicle may search for a subset of pose initialization locations. Regarding the latter example, the comparison may be conducted between the candidate location and any pose initialization locations within twice the radius discussed above.

At operation 302, example process 300 may include sampling a portion of map data at a candidate location. For example, operation 302 may be part of iteratively sampling map data along roadways in global map data at intervals along the roadway (e.g., every 4 inches, every foot, every meter).

At operation 304, example process 300 may include determining whether a candidate parking location is associated with the portion of the map data. For example, operation 304 may comprise determining whether the map data indicates a candidate parking location where a vehicle 102 may execute a pose initialization. The candidate parking location may, for example, be in an accessible location (e.g., on the shoulder of a road, in a designated parking space, in or near a parking garage) where a vehicle 102 may navigate and park safely. A candidate parking location may be proximate a unique or distinct set of environment features and/or characteristics, which may improve the efficiency of the pose initialization execution, as discussed above. Operation 304 may include determining whether such a candidate parking location exists within a threshold distance of the candidate location. If not, example process 300 may revert to operation 302 to sample a new portion of map data at a candidate location.

At operation 306, example process 300 may include modifying the map data based on the candidate parking location. Operation 306 may comprise altering the candidate location to be a location associated with a center of the candidate parking location. Additionally or alternatively, the map data itself may be altered to account for the potential existence of dynamic objects, environmental interference (e.g., fog, snow, rain), and/or the like, to test the suitability of the candidate location for use as a pose initialization location. For example, the features/characteristics/surroundings of the candidate parking location may be altered or otherwise modified (e.g., by adding noise, adding/removing simulated dynamic objects, removing a portion of the map data attributable to occlusions based on a field of view from the candidate location and sensor capabilities associated with the vehicle). In some examples, adding noise may comprise altering surfaces in the environment and/or masking or removing portions of surfaces in the environment. Additionally or alternatively, adding noise may be based on characteristics of one or more sensor types of the vehicle 102. For example, map data beyond an effective range of a particular sensor type may be masked out and/or noise up to that point may increase linearly and at or just before that effective range may increase logarithmically or exponentially. In some examples, the position and/or orientation of a vehicle 102 relative to the candidate parking location may be modified (e.g., turn the car x number of degrees, rotate the vehicle to face a different direction, shift the vehicle such that it is not directly in the candidate parking location, tilt/orient the vehicle at an angle off-center relative to the candidate parking location, etc.).

At operation 308, example process 300 may include generating modified simulated sensor data at the candidate parking location based at least in part on the map data. For example, operation 308 may comprise simulating sensor data to include more or fewer static and/or dynamic objects, to introduce occlusions and/or noise according to the techniques discussed herein, to create and/or remove environmental interference (e.g., rain, fog, snow), or may otherwise generate modified simulated sensor data at the candidate parking location based at least in part on the map data and one or more simulated sensor data locations and/or characteristics (e.g., field of view, orientation, attenuation, modality, general capabilities).

At operation 310, example process 300 may include determining a difference between the map data at the candidate location and the map data at an existing pose initialization location. In some examples, operation 310 may additionally or alternatively comprise simulated sensor data that may be received by the vehicle at the candidate location and simulating sensor data that may be received by the vehicle at the existing pose initialization location and comparing the two sets of sensor data. In some examples, operation 310 may comprise determining a difference between the map data at one or more of the candidate locations and an existing pose initialization location. In such an example, one or more candidate locations may be compared with each other, and may additionally or alternatively be compared with an existing candidate location to determine the difference between the map data at the one or more candidate locations and an existing pose initialization location. As a nonlimiting example, the modified map data at candidate location A and the modified map data at candidate location B may first be compared to each other to determine a difference between the two candidate locations. Additionally or alternatively, the modified map data of candidate location A and/or B may then be compared to an existing pose initialization location C to determine a difference. In other examples, the map data at a candidate location may be compared to the map data at an existing pose initialization location in isolation (i.e., one at a time), or map data of two or more candidate locations may be compared to map data of one or more existing pose initialization locations to determine one or more differences.

At operation 312, if the difference meets or exceeds a threshold difference, example process 300 may continue to operation 314; otherwise, example process 300 may discard the candidate location and return to operation 302 to determine a new candidate location. If the difference between the map data at one or more candidate locations and an existing pose initialization location meets or exceeds a threshold difference, such a difference may indicate that the candidate location is sufficiently unique and/or distinct from the existing pose initialization location.

At operation 314, example process 300 may comprise adding the candidate location (and its associated map data and/or geolocation) to the set of pose initialization locations as a new pose initialization location.

At operation 316, example process 300 may comprise transmitting an updated set of pose initialization locations to one or more vehicles. In some examples, operation 316 may comprise transmitting such pose initialization locations to one or more vehicles as they are added, once a threshold number of new pose initialization locations are added, or the like. Additionally or alternatively, operation 316 may transmit the updated set (or at least the newest additions) responsive to a request received from a vehicle.

Example process 300 may be iteratively repeated with one or more portions of map data and one or more candidate parking locations in each portion of map data to determine an updated set of pose initialization locations. Additionally or alternatively, example process 300 may be executed at least in part in a simulated environment.

Example System

Figure 4:
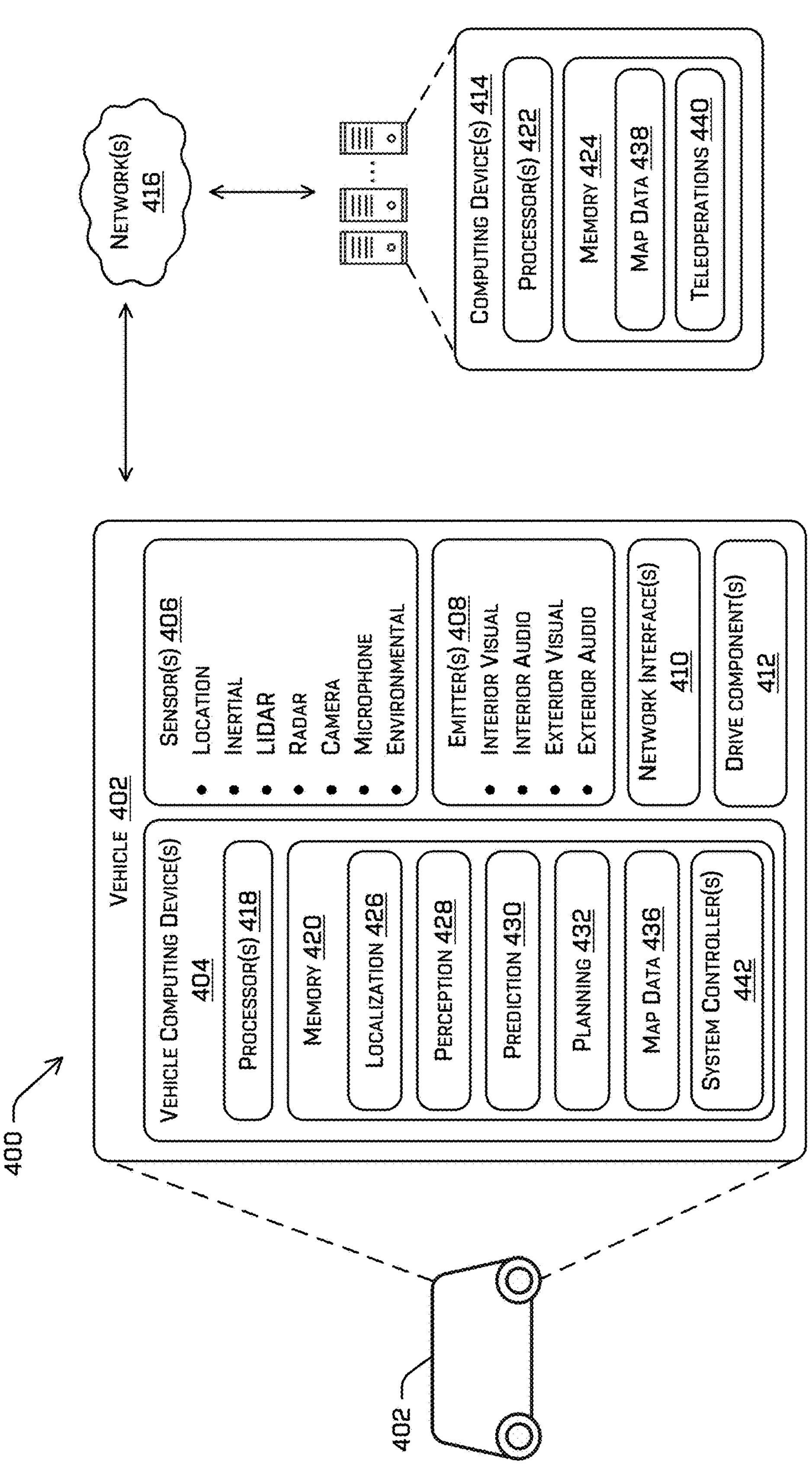
FIG. 4 depicts a block diagram of an example system for implementing various techniques described herein.

FIG. 4 illustrates a block diagram of an example system 400 that implements the techniques discussed herein. In some instances, the example system 400 may include a vehicle 402, which may represent the vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well. In some examples, the vehicle 401 may represent vehicle 102.

The vehicle 402 may include a vehicle computing device(s) 404, sensor(s) 406, emitter(s) 408, network interface(s) 410, and/or drive component(s) 412. Vehicle computing device(s) 404 may represent computing device(s) 106 and sensor(s) 406 may represent sensor(s) 104. The system 400 may additionally or alternatively comprise computing device(s) 414.

In some instances, the sensor(s) 406 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 414.

The vehicle 402 may also include emitter(s) 408 for emitting light and/or sound, as described above. The emitter(s) 408 in this example may include interior audio and visual emitter(s) to communicate with passengers of the vehicle 402. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive component(s) 412. Also, the network interface(s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 414. In some examples, computing device(s) 414 may comprise one or more nodes of a distributed computing system (e.g., a cloud computing architecture).

The network interface(s) 410 may include physical and/or logical interfaces for connecting the vehicle computing device(s) 404 to another computing device or a network, such as network(s) 416. For example, the network interface(s) 410 may enable Wi-Fi-based communication such as via frequencies defined by the IEEE 802.11 standards, short range wireless frequencies such as ultra-high frequency (UHF) radio (e.g., Bluetooth®), cellular communication (e.g., 2G, 6G, 4G, 4G LTE, 5G, etc.), or any suitable wired or wireless communications protocol that enables the respective computing device to interface with the other computing device(s). In some instances, the vehicle computing device(s) 404 and/or the sensor(s) 406 may send sensor data, via the network(s) 416, to the computing device(s) 414 at a particular frequency, after a lapse of a predetermined period of time, in near real-time, etc.

In some instances, the vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device(s) 404 may include processor(s) 418 and memory 420 communicatively coupled with the one or more processors 418. Memory 420 may represent memory 108. Computing device(s) 414 may also include processor(s) 422, memory 424, map data 438, and/or a teleoperations component 440. The processor(s) 418 and/or 422 may be any suitable processor capable of executing instructions to process data and perform operations as described herein. By way of example and not limitation, the processor(s) 418 and/or 422 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 420 and/or 424 may be examples of non-transitory computer-readable media. The memory 420 and/or 424 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 420 and/or memory 424 may store a localization component 426, perception component 428, prediction component 430, planning component 432, map data 436, and/or system controller(s) 442. Perception component 428 may represent perception component 110, prediction component 430 may represent prediction component 112, planning component 432 may represent planning component 114, and/or map data 436 may represent map data 118.

In at least one example, the localization component 426 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 426 may include and/or request/receive map(s) 434 (e.g., map data) of an environment and can continuously determine a location, velocity, and/or orientation of the autonomous vehicle within the map(s) 434. In some instances, the localization component 426 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 426 may provide data to various components of the vehicle 402 to determine an initial position of an autonomous vehicle, as discussed herein. In some examples, localization component 426 may provide, to the planning component 432, a location and/or orientation of the vehicle 402 relative to the environment and/or sensor data associated therewith.

In some instances, perception component 428 may detect object(s) in in an environment surrounding the vehicle 402 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. In some examples, the perception component 428 may determine a top-down representation of the environment that encodes the classification(s), position(s), orientation(s), velocity(ies), acceleration(s), and/or other states of the objects, map data, and/or general environment state data for the environment. For example, the top-down representation may be an image with additional data embedded therein, such as where various pixel channel values encode the perception data and/or map data discussed herein. The top-down representation of the environment may be a birds eye view image that encodes information associated with the environment such as a detected object in the environment and/or map data (e.g., which may indicate a roadway shape and extents, signage, static object(s), and/or the like), as discussed in U.S. Patent Application Pub. No. 2021/0181758, filed Jan. 30, 2020, the entirety of which is incorporated by reference herein for all purposes. Data determined by the perception component 428 is referred to as perception data.

The prediction component 430 may predict a future state of an object in the environment surrounding the vehicle 402. The future (predicted) state may include a predicted position and/or orientation of an object and/or a predicted trajectory of the object, which may indicate a predicted series of or continuous indication of position and/or orientation of the object. In some examples, the predicted position and/or orientation and/or predicted trajectory may be time-invariant (without regard to time), although in another example, the predicted position and/or orientation and/or predicted trajectory may be time-variant. In the latter example, a pose of the trajectory and/or the predicted pose may be associated with a future time. Accordingly, the predicted trajectory may inherently encode vehicle velocity based on the distance covered by the predicted poses in time. Data determined by the prediction component 430 is referred to as prediction data. In some examples, the prediction component 430 may determine a top-down representation of a predicted future state of the environment. For example, the top-down representation may be an image with additional data embedded therein, such as where various channel pixel values encode the prediction data discussed herein.

The planning component 432 may receive a location and/or orientation of the vehicle 402 from the localization component 426 and/or perception data from the perception component 428 and may determine instructions for controlling operation of the vehicle 402 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 442 and/or drive component(s) 412 may parse/cause to be carried out, second instructions for the emitter(s) 408 may be formatted according to a second format associated therewith).

Although localization component 426, perception component 428, prediction component 430, planning component 432, map(s) 434, and/or system controller(s) 442 are illustrated as being stored in memory 420, any of these components may include processor-executable instructions, machine-learned model(s) (e.g., a neural network), and/or hardware and all or part of any of these components may be stored on memory 420 or configured as part of computing device(s) 414.

As described herein, the localization component 426, the perception component 428, the prediction component 430, planning component 432, and/or other components of the system 400 may comprise one or more ML models. For example, the localization component 426, the perception component 428, the prediction component 430, and/or the planning component 432 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, and the like or visual transformers (ViTs), such as ConvNeXt.

Memory 420 may additionally or alternatively store one or more system controller(s) 442, which may be configured to control steering, propulsion, braking, safety, emitters, communication, and other systems of the vehicle 402. These system controller(s) 442 may communicate with and/or control corresponding systems of the drive component(s) 412 and/or other components of the vehicle 402. For example, the planning component 432 may generate instructions based at least in part on perception data generated by the perception component 428, which the trajectory verification component 432 may validate and/or transmit to the system controller(s) 442. The system controller(s) 442 may control operation of the vehicle 402 based at least in part on the instructions received from the planning component 432. In some examples, these instructions may be based at least in part on map data generated according to the techniques discussed herein. In some examples, a trajectory verification component may replace instructions generated by the planning component 432 with alternate instructions associated with a contingent trajectory such as, for example, a contingent trajectory that may specify an alternate maneuver, and/or the like.

In some examples, remote computing device(s) 414 may determine map data 438 based at least in part on log data received from one or more vehicles. For example, the remote computing device(s) 414 may determine the map data 438 using operations discussed in U.S. Pat. No. 11,657,719, filed on Dec. 18, 2020, the entirety of which is incorporated herein for all purposes. The map data 438, or a portion thereof, may then be transmitted to vehicle 402 as map data 436. For example, map data 436 may be a portion of map data 438, such as map data associated with a region in which the vehicle 402 is assigned to operation.

In some examples, the teleoperations component 440 may include hardware and/or software for providing instructions and/or feedback to the vehicle 402, as discussed in more detail in U.S. Pat. No. 11,891,088, filed Jun. 14, 2021, the entirety of which is incorporated by reference herein for all intents and purposes. The teleoperations component 440 may present a user interface (e.g., a graphical user interface, an auditory interface, a tactile feedback component) to a teleoperator (e.g., a human user, an artificial intelligence component) that comprises sensor data, perception data, a representation of the simulation discussed herein, and/or like. For example, the teleoperations component 440 may receive an indication that the vehicle 402 was unable to determine an estimated location of the vehicle or failed to determine a sufficient confidence score to indicate that the vehicle 402 is located at a pose initialization location. In such an example, a teleoperator may provide an indication of the vehicle's location for the vehicle to use as an estimated location, may indicate that the vehicle is located at a particular pose initialization location (e.g., which may be helpful if the vehicle is located at a pose initialization location but the confidence score associated therewith was low due to a high number of dynamic objects in the environment, a may indicate a nearest pose initialization location to the vehicle, and/or to guide the vehicle to a pose initialization location.

It should be noted that while FIG. 4 is illustrated as a distributed system, in alternative examples, components of the vehicle 402 may be associated with the computing device(s) 414 and/or components of the computing device(s) 414 may be associated with the vehicle 402. That is, the vehicle 402 may perform one or more of the functions associated with the computing device(s) 414, and vice versa.

Example Clauses

A: A system comprising: one or more processors; and a non-transitory memory storing processor-executable instructions that, when executed by the one or more processors, cause the system to perform operations comprising: detecting a pose initialization trigger event; determining, based at least in part on first sensor data or a stored pose, an estimated location of a vehicle; determining, based at least in part on the estimated location, a subset of pose initialization locations; receiving second sensor data indicating environment features of an environment proximate the vehicle; determining a first confidence score for a first pose initialization location of the subset of pose initialization locations, wherein determining the first confidence score comprises: determining a difference between a portion of the second sensor data and a surface indicated by map data associated with the first pose initialization location, and determining a percentage of the second sensor data detected as static objects using the second sensor data; determining that the vehicle is located at the first pose initialization location based at least in part on at least one determining that the first confidence score meets or exceeds a confidence threshold or that the first confidence score is a maximum confidence score among a set of confidence scores determined for the subset of pose initialization locations; determining, based at least in part on a geolocation and the map data associated with the first pose initialization location and a relative position of the vehicle determined based at least in part on the second sensor data and the map data, an initial pose of the vehicle; and controlling the vehicle based at least in part on the initial pose.

B: The system as recited in paragraph A, wherein determining the subset of pose initialization locations based at least in part on the estimated location comprises determining the subset of pose initialization locations from among a superset of pose initialization locations based at least in part on one or more of: determining that the subset of pose initialization locations is within a threshold distance of the estimated location, or determining that the subset of pose initialization locations are indicated in a database as being available.

C: The system as recited in either paragraph A or B, wherein the pose initialization trigger event comprises one or more of: determining a charge event based at least in part on third sensor data; determining an impact event based at least in part on the third sensor data; determining a sensor failure or impairment based at least in part on the third sensor data; receiving an indication that a reboot event occurred; receiving an indication that a repair or diagnostic event occurred or receiving an instruction to perform a repair or diagnostic event; determining a passage of time that exceeds a threshold amount of time based at least in part on the third sensor data; receiving an indication that a mode of operation of the vehicle changed; or receiving an instruction to initialize a pose of the vehicle from a remote computing device.

D: The system as recited in any one of paragraphs A-C, wherein the first sensor data or the second sensor data comprises data attributable to an indicator, the indicator comprising a unique identifier.

E: The system as recited in paragraph D, wherein the unique identifier comprises one or more of: a retrievable identification number; a quick-response (QR) code; a barcode; a physical object having physical properties unique to the physical object; an indication of signal strength from two or more network devices; data received from one or more emitters; or a network device transmitted code.

F: The system as recited in any one of paragraphs A-E, wherein the subset of pose initialization locations comprises one or more pose initialization locations within a threshold radius of the estimated location of the vehicle.

G: One or more non-transitory computer-readable media storing processor-executable instructions that, when executed by one or more processors, cause the one or more processors to perform operations comprising: receiving sensor data at a vehicle; determining, based at least in part on the sensor data, that the vehicle is located within a threshold distance of a first predetermined location from among a set of predetermined initialization locations; determining, based at least in part on the sensor data and the first predetermined location, an initial pose of the vehicle; and controlling the vehicle based at least in part on the initial pose.

H: The one or more non-transitory computer-readable media of paragraph G, the operations further comprising determining an estimated location of the vehicle wherein determining the estimated location comprises one or more of: determining the estimated location of the vehicle based at least in part on a location of the vehicle indicated in the sensor data; determining a relative position of the vehicle to an indicator identified by the sensor data; determining a region associated with operation of the vehicle; or determining that a stored pose is associated with a cessation of a mode or operation of the vehicle at a previous time.

I: The one or more non-transitory computer-readable media of either paragraph G or H, the operations further comprising determining a difference between a portion of the sensor data and a surface indicated by map data, wherein determining the difference comprises: determining a portion of the sensor data attributable to static objects; determining, based at least in part on optimizing the portion of sensor data attributable to static objects with the map data associated with the first predetermined location, an optimized representation of the map data; and determining, based at least in part on the optimized representation of the map data, an average distance between the portion of the sensor data attributable to static objects and the surface indicated by the map data.

J: The one or more non-transitory computer-readable media of any one of paragraphs G-I, wherein controlling the vehicle based at least in part on the initial pose comprises using the initial pose to at least one of track progress of the vehicle in an environment or determine a trajectory for controlling the vehicle based at least in part on the initial pose or a subsequent pose of the vehicle determined based at least in part on the initial pose.

K: The one or more non-transitory computer-readable media of any one of paragraphs G-J, the operations further comprising determining an estimated location of the vehicle, and wherein the set of predetermined initialization locations comprises one or more initialization locations within a threshold radius of the estimated location.

L: The one or more non-transitory computer-readable media of any one of paragraphs G-K, wherein determining that the vehicle is located within a threshold distance of a first predetermined location from among the set of predetermined initialization locations further comprises: determining a difference between a portion of the sensor data and a surface indicated by map data associated with a first initialization location of the set of predetermined initialization locations; and determining that the vehicle is located at the first initialization location based at least in part on determining that at least one of the difference is below a threshold difference or the difference is a minimum difference from among a set of differences determined for the set of predetermined initialization locations.

M: The one or more non-transitory computer-readable media of any one of paragraphs G-L, further comprising detecting a pose initialization trigger event, the pose initialization trigger event comprising one or more of: determining a charge event based at least in part on third sensor data; determining an impact event based at least in part on the third sensor data; determining a sensor failure or impairment based at least in part on the third sensor data; receiving an indication that a reboot event occurred; receiving an indication that a repair or diagnostic event occurred or receiving an instruction to perform a repair or diagnostic event; determining a passage of time that exceeds a threshold amount of time based at least in part on the third sensor data; receiving an indication that a mode of operation of the vehicle changed; or receiving an instruction to initialize a pose of the vehicle from a remote computing device.

N: The one or more non-transitory computer-readable media of any one of paragraphs G-M, wherein the sensor data comprises an indication of or is used to determine one or more of: a retrievable identification number; a quick-response (QR) code; a barcode; a physical object having physical properties unique to the physical object; an indication of signal strength from two or more network devices; data associated with an indicator; data received from one or more emitters; or a network device transmitted code.

O: A method comprising: receiving sensor data at a vehicle; determining, based at least in part on the sensor data, that the vehicle is located within a threshold distance of a first predetermined location from among a set of predetermined initialization locations; determining, based at least in part on the sensor data and the first predetermined location, an initial pose of the vehicle; and controlling the vehicle based at least in part on the initial pose.

P: The method of paragraph O, further comprising determining an estimated location of the vehicle, wherein determining the estimated location of the vehicle comprises one or more of: determining the estimated location of the vehicle based at least in part on a location of the vehicle indicated in the sensor data; determining a relative position of the vehicle to an indicator identified by the sensor data; determining a region associated with operation of the vehicle; or determining that a stored pose is associated with a cessation of a mode or operation of the vehicle at a previous time.

Q: The method of either paragraph O or P further comprising determining a difference between a portion of the sensor data and a surface indicated by map data, wherein determining the difference comprises: determining a portion of the sensor data attributable to static objects; determining, based at least in part on optimizing the portion of sensor data attributable to static objects with the map data associated with the first predetermined location, an optimized representation of the map data; and determining, based at least in part on the optimized representation of the map data, an average distance between the portion of the sensor data attributable to static objects and the surface indicated by the map data.

R: The method of any one of paragraphs O-Q, wherein controlling the vehicle based at least in part on the initial pose comprises using the initial pose to at least one of track progress of the vehicle in an environment or determine a trajectory for controlling the vehicle based at least in part on the initial pose or a subsequent pose of the vehicle determined based at least in part on the initial pose.

S: The method of any one of paragraphs O-R, wherein the set of predetermined initialization locations comprises one or more pose initialization locations within a threshold radius of an estimated location of the vehicle.

T: The method of any one of paragraphs O-S, wherein the sensor data comprises an indication of or is used to determine one or more of: a retrievable identification number; a quick-response (QR) code; a barcode; a physical object having physical properties unique to the physical object; an indication of signal strength from two or more network devices; data received from one or more emitters; a unique identifier; or a network device transmitted code.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase “at least one of X, Y or Z,” unless specifically stated otherwise, is to be understood to present that an item, term, etc. may be either X, Y, or Z, or any combination thereof, including multiples of each element. Unless explicitly described as singular, “a” means singular and plural. When referring to a collection of items as a “set,” it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and a non-transitory memory storing processor-executable instructions that, when executed by the one or more processors, cause the system to perform operations comprising:

detecting a pose initialization trigger event, the pose initialization trigger event causing an error associated with a pose of a vehicle;

determining, based at least in part on first sensor data or a stored pose, an estimated location of the vehicle;

determining, based at least in part on the estimated location, a set of candidate pose initialization locations within a radius distance of the estimated location;

receiving second sensor data indicating environment features of an environment proximate the vehicle;

determining a first confidence score for a first pose initialization location of the set of candidate pose initialization locations, wherein determining the first confidence score comprises:

determining a difference between a portion of the second sensor data and a surface indicated by map data associated with the first pose initialization location, and determining a percentage of the second sensor data detected as static objects using the second sensor data;

determining that the vehicle is located at the first pose initialization location based at least in part on at least one of determining that the first confidence score meets or exceeds a confidence threshold or that the first confidence score is a maximum confidence score among a set of confidence scores determined for the set of candidate pose initialization locations;

determining, based at least in part on a geolocation and the map data associated with the first pose initialization location and a relative position of the vehicle determined based at least in part on the second sensor data and the map data, an initial pose of the vehicle configured to at least partially mitigate the error; and controlling the vehicle based at least in part on the initial pose.

2. The system as recited in claim 1, wherein determining the set of candidate pose initialization locations based at least in part on the estimated location comprises determining the set of candidate pose initialization locations from among a superset of pose initialization locations based at least in part on one or more of:

determining that the set of candidate pose initialization locations is within a threshold distance of the estimated location, or determining that the set of candidate pose initialization locations are indicated in a database as being available.

3. The system as recited in claim 1, wherein the pose initialization trigger event comprises one or more of:

determining a charge event based at least in part on third sensor data;

determining an impact event based at least in part on the third sensor data;

determining a sensor failure or impairment based at least in part on the third sensor data;

receiving an indication that a reboot event occurred;

receiving an indication that a repair or diagnostic event occurred or receiving an instruction to perform a repair or diagnostic event;

determining a passage of time that exceeds a threshold amount of time based at least in part on the third sensor data;

receiving an indication that a mode of operation of the vehicle changed; or receiving an instruction to initialize a pose of the vehicle from a remote computing device.

4. The system as recited in claim 1, wherein the first sensor data or the second sensor data comprises data attributable to an indicator, the indicator comprising a unique identifier.

5. The system as recited in claim 4, wherein the unique identifier comprises one or more of:

a retrievable identification number;

a quick-response (QR) code;

a barcode;

a physical object having physical properties unique to the physical object;

an indication of signal strength from two or more network devices;

data received from one or more emitters; or a network device transmitted code.

6. One or more non-transitory computer-readable media storing processor-executable instructions that, when executed by one or more processors, cause the one or more processors to perform operations comprising:

receiving sensor data at a vehicle, the sensor data indicating an error associated with a pose of the vehicle;

determining, based at least in part on the pose, a set of predetermined initialization locations within a first threshold distance of the vehicle;

determining that a first initialization location of the set of predetermined initialization locations is available;

determining, based at least in part on the sensor data and the first initialization location being available, an updated pose of the vehicle configured to at least partially mitigate the error; and controlling the vehicle based at least in part on the updated pose.

7. The one or more non-transitory computer-readable media of claim 6, the operations further comprising determining an estimated location of the vehicle wherein determining the estimated location comprises one or more of:

determining the estimated location of the vehicle based at least in part on a location of the vehicle indicated in the sensor data;

determining a relative position of the vehicle to an indicator identified by the sensor data;

determining a region associated with operation of the vehicle; or determining that a stored pose is associated with a cessation of a mode or operation of the vehicle at a previous time.

8. The one or more non-transitory computer-readable media of claim 6, the operations further comprising determining a difference between a portion of the sensor data and a surface indicated by map data, wherein determining the difference comprises:

determining a portion of the sensor data attributable to static objects;

determining, based at least in part on optimizing the portion of sensor data attributable to static objects with the map data associated with the first initialization location, an optimized representation of the map data; and determining, based at least in part on the optimized representation of the map data, an average distance between the portion of the sensor data attributable to static objects and the surface indicated by the map data.

9. The one or more non-transitory computer-readable media of claim 6, wherein controlling the vehicle based at least in part on the updated pose comprises using the updated pose to at least one of:

track progress of the vehicle in an environment; or determine a trajectory for controlling the vehicle based at least in part on the updated pose or a subsequent pose of the vehicle determined based at least in part on the updated pose.

10. The one or more non-transitory computer-readable media of claim 6, the operations further comprising determining an estimated location of the vehicle, and wherein the set of predetermined initialization locations comprises one or more initialization locations within a threshold radius of the estimated location.

11. The one or more non-transitory computer-readable media of claim 6, wherein determining that the vehicle is located within a threshold distance of a first predetermined location from among the set of predetermined initialization locations further comprises:

determining a difference between a portion of the sensor data and a surface indicated by map data associated with the first initialization location of the set of predetermined initialization locations; and determining that the vehicle is located at the first initialization location based at least in part on determining that at least one of the difference is below a threshold difference or the difference is a minimum difference from among a set of differences determined for the set of predetermined initialization locations.

12. The one or more non-transitory computer-readable media of claim 6, further comprising detecting a pose initialization trigger event, the pose initialization trigger event comprising one or more of:

determining a charge event based at least in part on third sensor data;

determining an impact event based at least in part on the third sensor data;

determining a sensor failure or impairment based at least in part on the third sensor data;

receiving an indication that a reboot event occurred;

receiving an indication that a repair or diagnostic event occurred or receiving an instruction to perform a repair or diagnostic event;

determining a passage of time that exceeds a threshold amount of time based at least in part on the third sensor data;

receiving an indication that a mode of operation of the vehicle changed; or receiving an instruction to initialize a pose of the vehicle from a remote computing device.

13. The one or more non-transitory computer-readable media of claim 6, wherein the sensor data comprises an indication of or is used to determine one or more of:

a retrievable identification number;

a quick-response (QR) code;

a barcode;

a physical object having physical properties unique to the physical object;

an indication of signal strength from two or more network devices;

data associated with an indicator;

data received from one or more emitters; or a network device transmitted code.

14. The one or more non-transitory computer-readable media of claim 6, wherein the set of predetermined initialization locations comprises at least one of:

a first location proximate a charging station;

a second location proximate a maintenance depot;

a third location proximate a command or control center;

a parking space;

a fourth location proximate a building having features unique to the building;

a fifth location along a shoulder of a road;

a sixth location proximate a landmark or art installation;

a seventh location proximate a road feature;

a fifth location proximate a physical object having physical properties unique to the physical object; or a warehouse facility.

15. A method comprising:

receiving sensor data at a vehicle, the sensor data indicating an error associated with a pose of the vehicle;

determining, based at least in part on the sensor data, that the vehicle is located within a threshold distance of a set of candidate initialization locations;

determining a first initialization location from among the set of candidate initialization locations, the first initialization location comprising a physical object having characteristics unique to the physical object;

determining, based at least in part on the sensor data and the first initialization location, an updated pose of the vehicle configured to at least partially mitigate the error; and controlling the vehicle based at least in part on the updated pose.

16. The method of claim 15, further comprising determining an estimated location of the vehicle, wherein determining the estimated location of the vehicle comprises one or more of:

determining the estimated location of the vehicle based at least in part on a location of the vehicle indicated in the sensor data;

determining a relative position of the vehicle to an indicator identified by the sensor data;

determining a region associated with operation of the vehicle; or determining that a stored pose is associated with a cessation of a mode or operation of the vehicle at a previous time.

17. The method of claim 15, further comprising determining a difference between a portion of the sensor data and a surface indicated by map data, wherein determining the difference comprises:

determining a portion of the sensor data attributable to static objects;

determining, based at least in part on optimizing the portion of sensor data attributable to static objects with the map data associated with the first initialization location, an optimized representation of the map data; and determining, based at least in part on the optimized representation of the map data, an average distance between the portion of the sensor data attributable to static objects and the surface indicated by the map data.

18. The method of claim 15, wherein controlling the vehicle based at least in part on the updated pose comprises using the updated pose to at least one of:

track progress of the vehicle in an environment; or determine a trajectory for controlling the vehicle based at least in part on the updated pose or a subsequent pose of the vehicle determined based at least in part on the updated pose.

19. The method of claim 15, wherein the sensor data comprises an indication of or is used to determine one or more of:

a retrievable identification number;

a quick-response (QR) code;

a barcode;

an indication of signal strength from two or more network devices;

data received from one or more emitters;

a unique identifier; or a network device transmitted code.

20. The method of claim 17, wherein the set of candidate initialization locations comprises at least one of:

a first location proximate a charging station;

a second location proximate a maintenance depot;

a third location proximate a command or control center;

a parking space;

a fourth location proximate a building having features unique to the building;

a fifth location along a shoulder of a road;

a sixth location proximate a landmark or art installation;

a seventh location proximate a road feature;

a fifth location proximate a physical object having physical properties unique to the physical object; or a warehouse facility.

* * * * *